(12) United States Patent
Nielsen et al.

(10) Patent No.: US 12,204,235 B2
(45) Date of Patent: Jan. 21, 2025

(54) SYSTEM AND METHOD FOR IMAGE PROJECTION MAPPING

(71) Applicant: Snap Inc., Santa Monica, CA (US)

(72) Inventors: Simon Saito Haagen Nielsen, Beverly Hills, CA (US); Zachary Collins Conatser, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/390,608

(22) Filed: Dec. 20, 2023

(65) Prior Publication Data

US 2024/0118598 A1 Apr. 11, 2024

Related U.S. Application Data

(63) Continuation of application No. 17/875,085, filed on Jul. 27, 2022, now Pat. No. 11,852,960, which is a
(Continued)

(51) Int. Cl.
| | |
|---|---|
| *G03B 21/14* | (2006.01) |
| *G05D 1/00* | (2006.01) |
| *G06F 9/30* | (2018.01) |
| *G06T 7/194* | (2017.01) |
| *B64U 10/13* | (2023.01) |
| *B64U 101/20* | (2023.01) |
| *B64U 101/30* | (2023.01) |

(52) U.S. Cl.
CPC ........... *G03B 21/14* (2013.01); *G05D 1/0202* (2013.01); *G06F 9/3004* (2013.01); *G06T 7/194* (2017.01); *B64U 10/13* (2023.01); *B64U 2101/20* (2023.01); *B64U 2101/30* (2023.01); *B64U 2201/10* (2023.01)

(58) Field of Classification Search
CPC ........... G06T 7/00; G06T 7/0002; G06T 7/20; G06T 7/50; G06T 7/60; G06T 7/70; G06T 7/73; G06T 7/215; G06T 7/292; G03B 21/14; G03B 21/145; G03B 21/147; B64C 39/00; B64C 39/024; B64C 39/028
See application file for complete search history.

(56) References Cited

U.S. PATENT DOCUMENTS

| | | |
|---|---|---|
| 9,776,200 B2 | 10/2017 | Busby et al. |
| 10,370,101 B2 | 8/2019 | Kales |

(Continued)

*Primary Examiner* — Sultan Chowdhury
(74) *Attorney, Agent, or Firm* — CM Law; Stephen J. Weed

(57) ABSTRACT

A system including a drone having a projector to project an image from a projection origin. The drone also has a navigation unit to determine location information for the drone. A processor coupled to the drone includes a memory. Execution of programming by the processor configures the system to obtain a projection surface architecture for a projection surface. The projection surface architecture includes reference points that correspond to physical locations on the projection surface. Each reference point is associated with relationship data with respect to an architecture origin. The system also receives location information for the drone, adapts the relationship data responsive to change in the location information, adjusts the image using the adapted relationship data, and projects the adjusted image onto the projection surface.

20 Claims, 23 Drawing Sheets

Related U.S. Application Data continuation of application No. 16/274,324, filed on Feb. 13, 2019, now Pat. No. 11,435,656.

(60) Provisional application No. 62/635,738, filed on Feb. 27, 2018.

(56) References Cited

U.S. PATENT DOCUMENTS

| | | |
|---|---|---|
| 10,399,676 B2 | 9/2019 | Dahlstrom |
| 11,029,707 B2 * | 6/2021 | Sasao .................... G08G 5/006 |
| 11,435,656 B1 | 9/2022 | Nielsen et al. |
| 2014/0233099 A1 | 8/2014 | Stark et al. |
| 2016/0284256 A1 | 9/2016 | Wigell |
| 2017/0221394 A1 | 8/2017 | Garcia Morchon et al. |
| 2018/0008797 A1 | 1/2018 | Kozloski et al. |
| 2019/0052852 A1 * | 2/2019 | Schick .................... G06T 7/593 |
| 2019/0094889 A1 | 3/2019 | Pohl et al. |
| 2019/0144111 A1 | 5/2019 | Apostolopoulos |
| 2019/0248485 A1 | 8/2019 | Ulaganathan et al. |

* cited by examiner

SYSTEM AND METHOD FOR IMAGE PROJECTION MAPPING

CROSS-REFERENCE TO RELATED APPLICATIONS

This application is a Continuation of U.S. application Ser. No. 17/875,085 filed on Jul. 27, 2022, which is a Continuation of U.S. application Ser. No. 16/274,324 filed on Feb. 13, 2019, now U.S. Pat. No. 11,435,656, and claims priority to U.S. Provisional Application Ser. No. 62/635,738 filed on Feb. 27, 2018, the contents of which are incorporated fully herein by reference.

TECHNICAL FIELD

The present subject matter relates to image projection mapping onto a projection surface.

BACKGROUND

Currently, many devices use projectors to visually present information onto surfaces. Conventional projectors typically project images onto structural surfaces from a fixed source position using lasers or high intensity projectors.

Projecting images onto structures is useful in many fields. For example, a series of images may be projected to disseminate information during an emergency. Images may also be projected onto surfaces for entertainment or for advertising products or services.

BRIEF DESCRIPTION OF THE DRAWINGS

The drawing figures depict non-limiting examples. In the figures, like reference numerals refer to the same or similar elements.

DETAILED DESCRIPTION

In the following detailed description, numerous specific details are set forth by way of examples to provide a thorough understanding of the relevant teachings. However, it should be apparent to those skilled in the art that the present teachings are applicable without such details. In other instances, well-known methods, procedures, components, and circuitry are described at a relatively high-level, without detail, in order to avoid unnecessarily obscuring aspects of the present teachings.

The term "coupled" as used herein refers to any logical, optical, physical or electrical connection, link or the like by which signals produced or supplied by one system element pass to another element. Unless described otherwise, coupled elements or devices do not necessarily directly connect to one another and may be separated by intermediate components, elements or communication media that may modify, manipulate or carry the signals.

In an example, a system includes a drone having a projector configured to project images from an origin. The system also includes a navigation unit configured to determine a location of the drone where the location is associated with the origin. The system further includes a processor coupled to the drone and a memory including programming accessible to the processor.

Execution of the programming by the processor configures the system to perform functions, including functions to obtain a projection surface architecture for a projection surface. The projection surface architecture includes reference points that correspond to physical locations on the projection surface, where each reference point is associated with relationship data with respect to an architecture origin. The execution of the programming additionally configures the system to receive location information for the drone from the navigation unit and adapt the relationship data responsive to change in the location information with respect to the architecture origin. The system is further configured to adjust the image using the adapted relationship data and project the adjusted image by the projector from the projection origin onto the projection surface.

Figure 1:
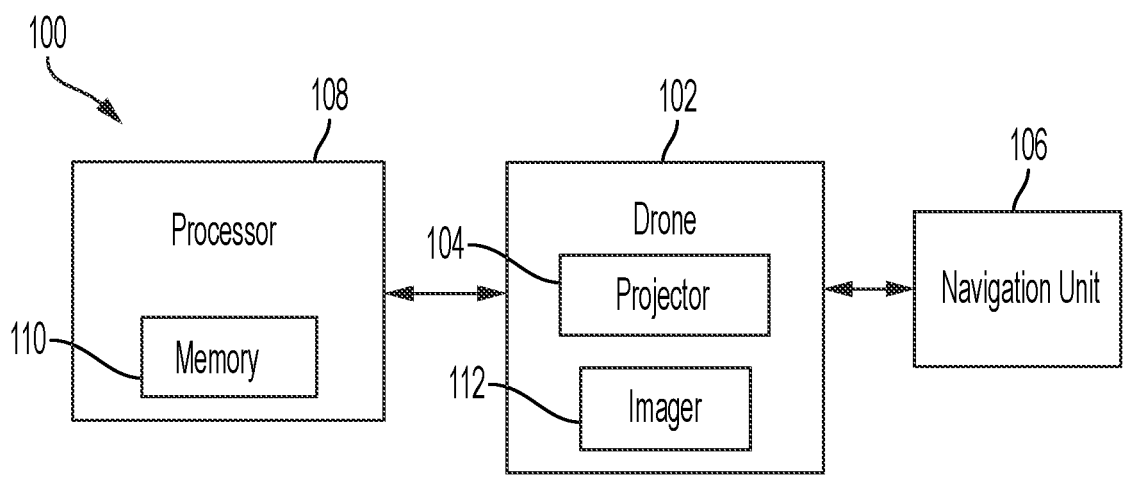
FIG. 1 is a block diagram of an example system for image projection mapping onto a projection surface utilizing a drone.
Figure 3:
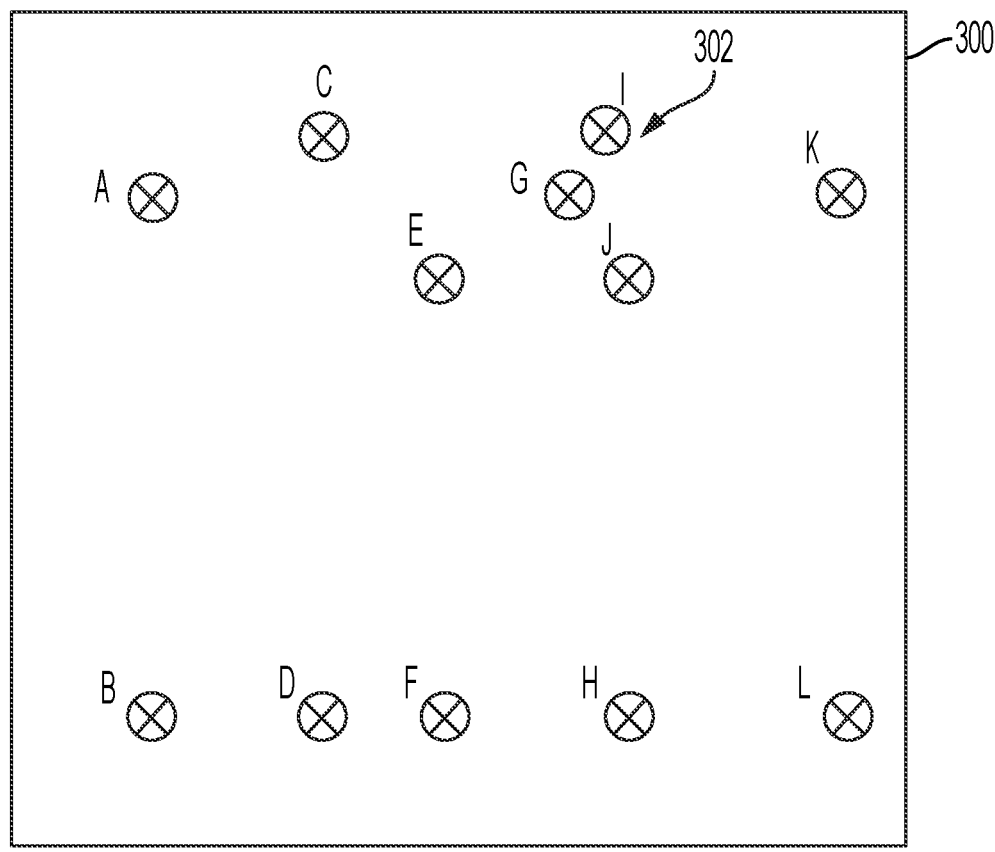
FIG. 3 is an example of a projection surface architecture on a projection surface utilizing a drone.
Figure 3:
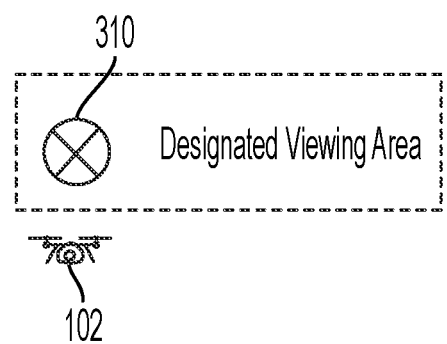

FIG. 1 is a block diagram of an example system 100 including a drone 102 having a projector 104 and an imager 112. The imager 112 is configured to capture images and the projector 104 is configured to project images from an origin 310 (FIG. 3) associated with the projector 104 of the drone 102 onto a projection surface 300 (FIG. 3). The projection surface is a surface of an object. In one example, the object is a stationary object. In another example, the object is a moving object. The projection surface includes, but is not limited to, a portion of a building, the ground, a moving vehicle, etc. In one example, the imager 112 is a gimballed camera.

The system 100 also includes a navigation unit 106. The navigation unit 106 is configured to determine a location of the drone 102. The navigation unit 106 may also determine an orientation of the drone. The orientation may include but is not limited to left, right, center, off centered, west, east, north south, up, down, degrees thereof, etc. The navigation unit 106 may be a global positioning system (GPS) such as a real time kinematic (RTK) GPS. The RTK GPS may provide a real-time position accuracy of the drone 102 at a centimeter level. The drone 102 may support the navigation unit 106 or the navigation unit 106 may be a separate component coupled to the drone 102.

In one example, the drone 102 remains stationary with respect to a stationary projection surface. As such, the relative location of the drone 102 remains the same with respect to the projection surface. In another example, the drone 102 and/or the projection surface moves with respect to one another. In accordance with this example, the relative location of the drone 102 changes with respect to the projection surface.

The system 100 also includes a processor 108 and a memory 110 coupled to the drone 102 and the navigation unit 106. The memory 110 stores one or more projection surface architectures representing the projection surface(s) and images for projection onto the projection surface(s) using the projections surface architecture(s). Additionally, the memory 110 may store instructions for execution by the processor 108 to perform one or more of the functions described herein. The processor 108 is coupled to the memory 110. The processor 108 is configured to perform functions, which are described in further detail below, for projecting images onto the projection surface(s). The drone may support the processor 108 and memory 110. Alternatively, the processor 108 and/or memory 110 may be separate components.

Figure 2:
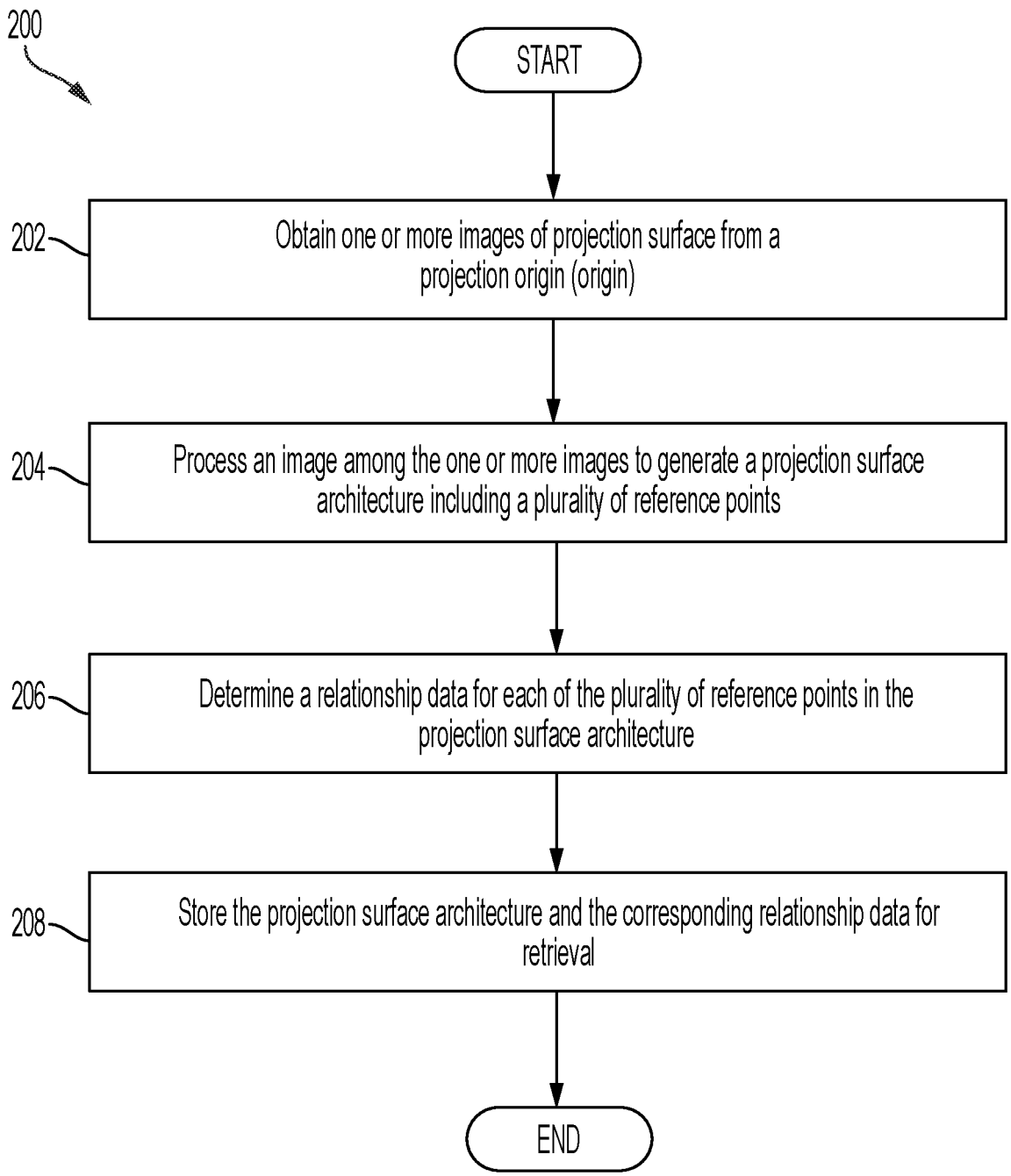
FIG. 2 is a flowchart illustrating an example of generating projection surface architecture for a projection surface utilizing system with a single drone.

FIG. 2 is a flow chart 200 illustrating an example method for generating a projection surface architecture for a projection surface in a system with a single drone. In one example, the method 200 is implemented by the system 100 of FIG. 1.

At block 202, the system obtains one or more images of a projection surface. The one or more images may be images taken from a desired future projection origin (origin), e.g., an imager of a drone may obtain images from a location where the projector of a drone may project a desired image in the future. In an example, the images are flat images taken from a location that is at a right angle to the center of the projection surface. In another example, the images are taken from a position off to the side/above/below in order to avoid obstacles or to match anticipated future projection locations.

The processor 108 may be configured to determine the projection origin (origin) 310 (FIG. 3) for the imager 112 at the current location of the drone 102 with respect to the projection surface. In one example, the processor 108 utilizes GPS location information from the navigation unit 106 and a known offset between the GPS location information and the origin of the projector 104 to determine the origin 310. In another example, the processor 108 utilizes computer vision (CV) software to process a captured image(s) of an area and a known offset between the computer vision location and the origin of the projector 104 to determine the origin 310. Suitable computer vision software will be apparent to one of skill in the art from the description herein.

At block 204, the system processes an image among the one or more images to generate a projection surface architecture including a plurality of reference points. The projection surface architecture may be a 2D, 3D, or 4D map of the projection surface. The processor 108 may process the image by identifying each of the plurality reference points on the captured image that correspond to physical locations represented by corresponding position markers on the projection surface. Each of the plurality of reference points represent a distinct point that is identifiable on the projection surface. In one example, a user manually identifies one or more reference points by selecting them on the image with a user input device. In another example, computer vision software automatically identifies one or more of the reference points. After identifying each of the plurality of reference points, the processor 108 may create a map of the projection surface utilizing the reference points.

FIG. 3 illustrates an example of a projection surface architecture projection surface 300 that includes reference points 302, e.g., reference points A, B, C, D, E, F, G, H, I, J, K, and L. Each of the reference points 302 correspond to a position marker representing a physical location on the projection surface 300. In one example, the position marker of each of the reference points 302 represents a distinct angle and distance of projection from an origin position marker. A drone 102 may capture one or more images of the projection surface with an imager 112 and the processor 108 may develop the projection surface architecture from the one or more of the captured images. The origin position marker in this example may be the origin 310 of the drone 102. Although FIG. 3 illustrates a single projection surface 300, multiple different projection surfaces may be utilized for projection mapping. In addition, although the projection surface architecture illustrates reference points 302 as specific physical locations on the projection surface 300, multiple different position reference points may be generated for one or more projection surfaces. In one example, multiple different projection surfaces and multiple different projection surface architectures with their corresponding multiple different reference points for each of the multiple different projection surfaces are stored in the memory 110.

Referring back to FIG. 2, at block 206, the system determines relationship data for each of the plurality of reference points in the projection surface architecture. The processor 108 may determine the relationship data. In one example, the processor 108 utilizes the navigation unit 106 to determine the relationship data. The relationship data may define a coordinate system that includes a distance between each of the reference points and the origin and/or an orientation of the drone 102 at the origin relative to each of the reference points on the projection surface. The processor 108 may retrieve the location and orientation of the drone 102 from the navigation unit 106 and determine the relationship data between the drone 102 and the projection surface 300 of FIG. 3. The orientation includes but is not limited to height, distance and direction of the drone 102 with respect to each of the reference points 302. The relationship data may be a combination of the distance and the orientation as described. In one example, the relationship data is determined in real time. In another example, the relationship data is determined in a time prior to the real time. The relationship data may be stored in the memory 110. In one example, the processor 108 utilizes the projector 104 to adjust the image(s) to be projected accurately onto the projection surface 300 based on the relationship data as described in detail below.

At block 208, the system stores the projection surface architecture and the corresponding relationship data for retrieval. The processor 108 of the system may store the projection surface architecture and the corresponding relationship data in the memory 110. The method 200 may repeat for each projection surface.

Figure 3A:
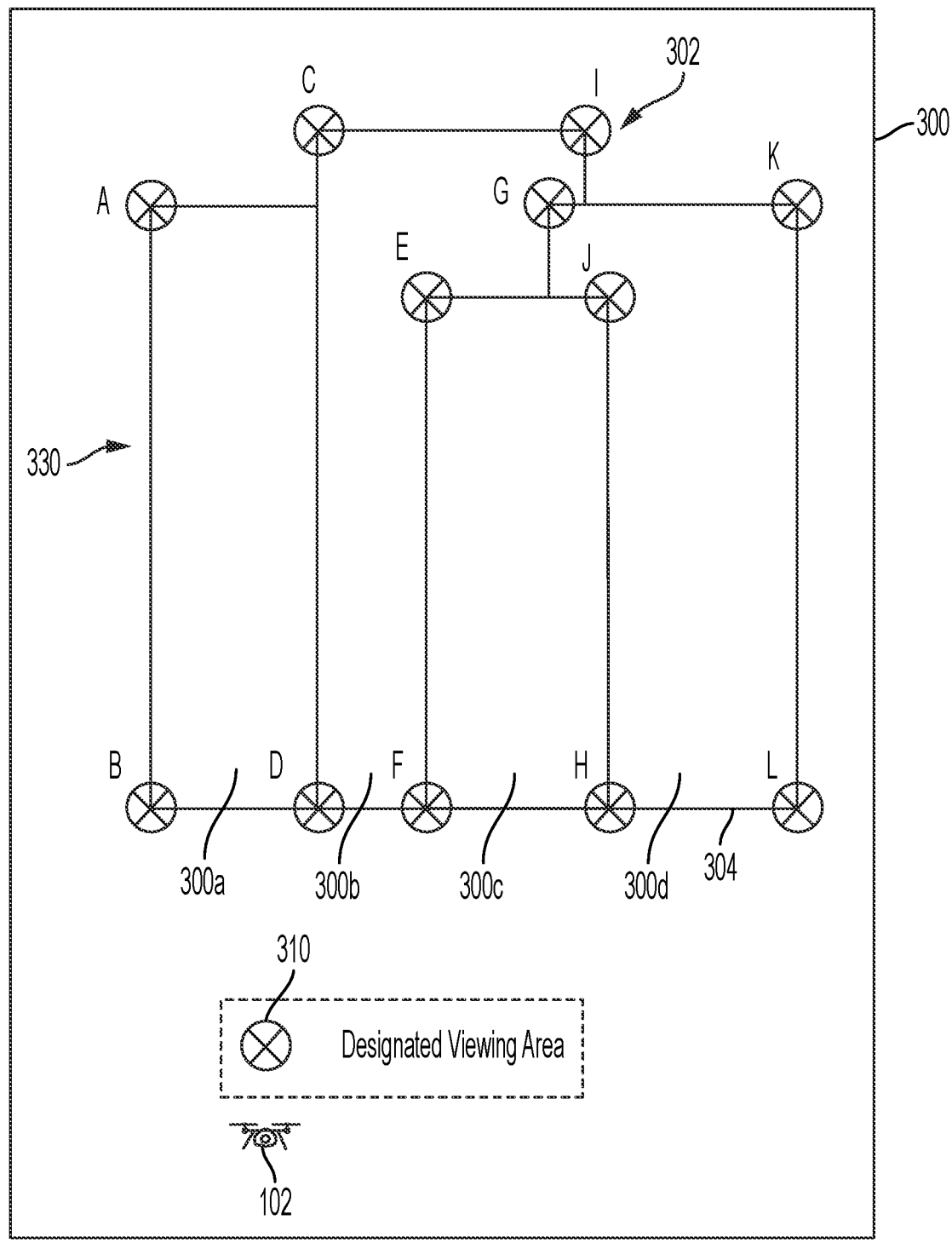
FIG. 3A is an example of reference points on the projection surface architecture of the projection surface of FIG. 3.

FIG. 3A depicts an example outline 330 of the projection surface architecture of the projection surface 300 of FIG. 3. The outline 330 defines an area of the projection surface 300 for projecting one or more images. As shown in FIG. 3A, one or more of the reference points 302 (e.g., A, B, C, D, E, F, G, H, I, J, K, and L) in the projection surface 300 are connected to a neighboring reference point 302 via a line 304. Also, one or more of the reference points 302 (e.g., I and G) is connected to the line 304 near the corresponding reference point 302. Accordingly, the projection surface 300 is divided into four unequal portions 300a, 300b, 320c and 300d. Although, the example of the projection surface 300 as shown in FIG. 3A is illustrated as four unequal portions, it is apparent that the projection surface 300 may be one portion or divided into two or more equal or unequal portions.

In one example, as discussed above, the position marker of each of the reference points 202 may represent a distinct angle and magnitude of projection from the origin position marker. As described below, the processor 108 and/or projector 104 may adjust/modify the image based on the position markers such that the image is presented on the projection surface as intended without distortion.

Figure 3B:
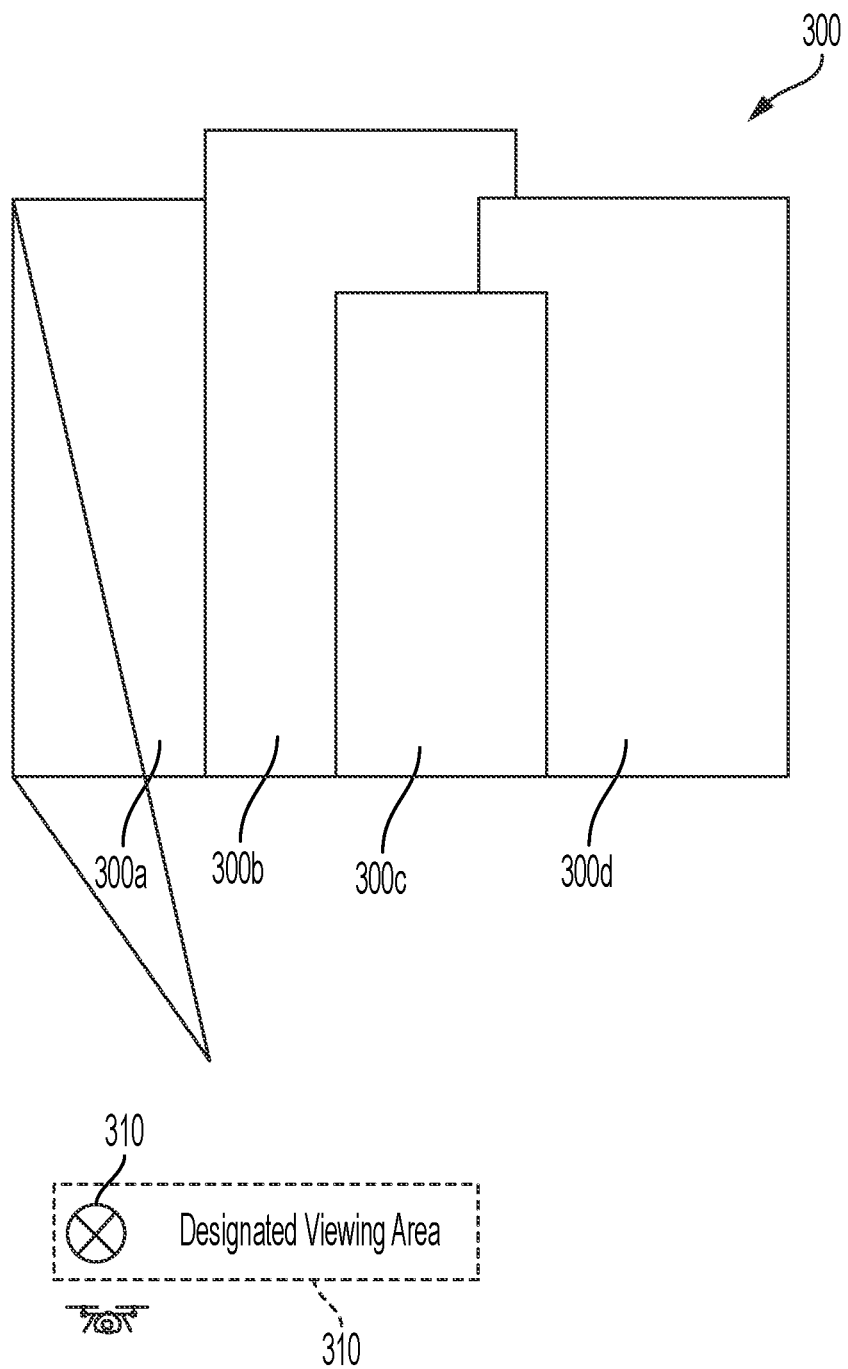
FIG. 3B is an example of boundaries of projections onto the projection surface architecture of the projection surface of FIG. 3 and an angle of projection of the drone.
Figure 3C:
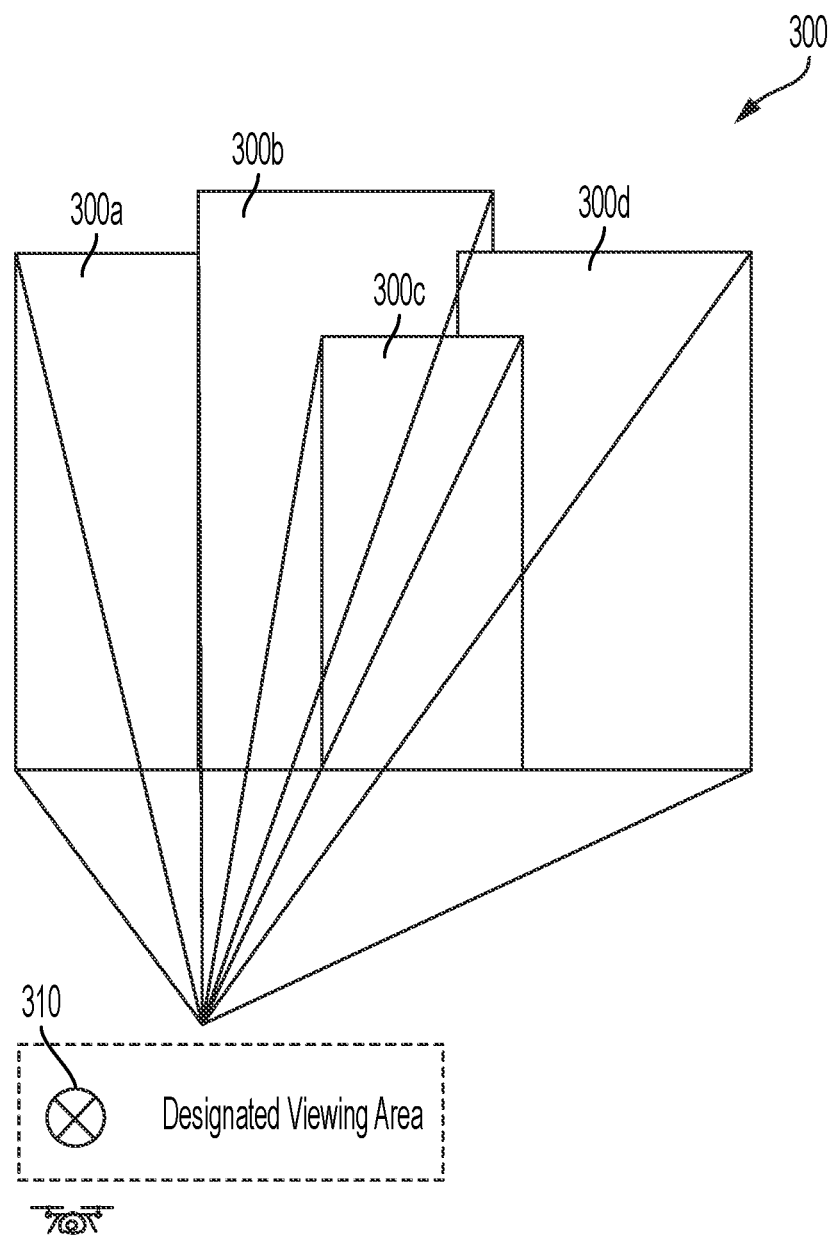
FIG. 3C is another example of boundaries of projections onto the projection surface architecture of the projection surface of FIG. 3 and an angle of projection of the drone.

In the example illustrated in FIG. 3B, two distinct reference points, A and B, are identified for use defining a boundary for projecting an image onto the projections surface 300. The processor 108 instructs the projector 104 in the drone 102 to adjust the image for projection from the origin 310 such that the image properly aligns with the two distinct reference points A and B of the projection surface 300. Additional reference points C, E, F, I, J, K and L define additional boundaries for projecting the image onto the projection surface 300 as shown in FIG. 3C. The processor 108 instructs the projector 104 in the drone 102 to adjust the image for projection from the origin 310 such that the image is properly aligned with respect to these additional distinct reference points C, E, F, I, J, K and L of the projection surface 300 (and may distort or otherwise transform the image for projection such that the image appears properly on the projection surface 300). Accordingly, a boundary of the projection surface 300 is set for projection of an image(s). Similarly, a boundary for each of the portions 300a, 300b, 300c and 300d may be set for projection of an image(s). Accordingly, the image(s) may be adjusted for projection onto different portions 300a, 300b, 300c and 300d of the projection surface 300. The image(s) may be spread accurately during projection throughout the outline 330 of the projection surface 300 with little or no perceived distortion. The spread image may be a continuous image.

In one example, the processor 108 functions to identify a set of distinct reference points for each of the portions 300a, 300b, 300c and 300d. For example, the processor may identify reference points A, B, C, and D of the portion 300a, reference points C, D, I and F of the portion 300b, the reference points E, F, J and H of the portion 300c, the reference points G, K, H and L of the portion 300d. In one example, the processor 108 functions to adjust one image for projection onto the four unequal portions 300a, 300b, 300c and 300d utilizing all the distinct reference points, A-L. In this example, four portions of the image are adjusted for projection within the corresponding distinct reference points for each of the portions 300a, 300b, 300c and 300d. For example, the processor 108 may adjust a first portion of the image for projection within the portion 300a defined by reference points A, B, C and D; a second portion of the image for projection within the portion 300b defined by reference points C, D, I and K; a third portion of the image for projection within the portion 300c defined by reference points E, F, J and H; and a fourth portion of the image for projection within the portion 300d defined by reference points G, K, H, and L.

Figure 3D:
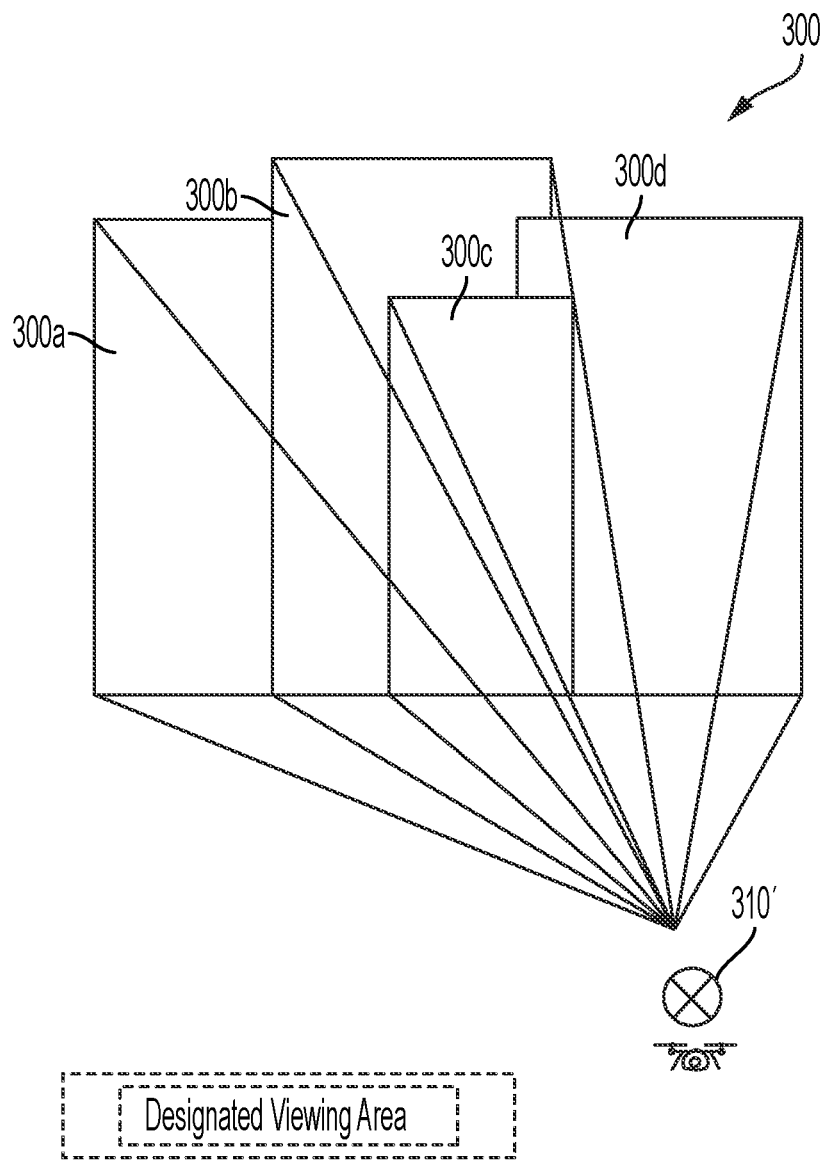
FIG. 3D is a further example of boundaries of image projections onto the projection surface architecture of the projection surface of FIG. 3 and an angle of projection of the drone due to movement of the drone.

Accordingly, the processor 108 functions to adjust each of the portions of the image to project a continuous image across all of the projection surfaces 300. The processor 108 may additionally function to adjust two or more distinct images for projection onto the four unequal portions 300a, 300b, 300c and 300d. For example, the processor 108 may adjust four distinct images separately for projection onto the four unequal portions 300a, 300b, 300c and 300d, respectively. In one example, the processor 108 utilizes the projector 104 to project beyond the projection surface 300. The image may be projected in some area outside the outline 230 such that there is some overlap around the outline 230 of the projection surface 300. In one example, the overlap of the image between 5%-10% of the total image size. This enables the projected image to remain covering the entire surface of a projection surface even if, for example, a sudden gust of wind moves the drone as illustrated in FIG. 3D and the drone projector has not had time to alter the image to accommodate the movement.

Figure 4:
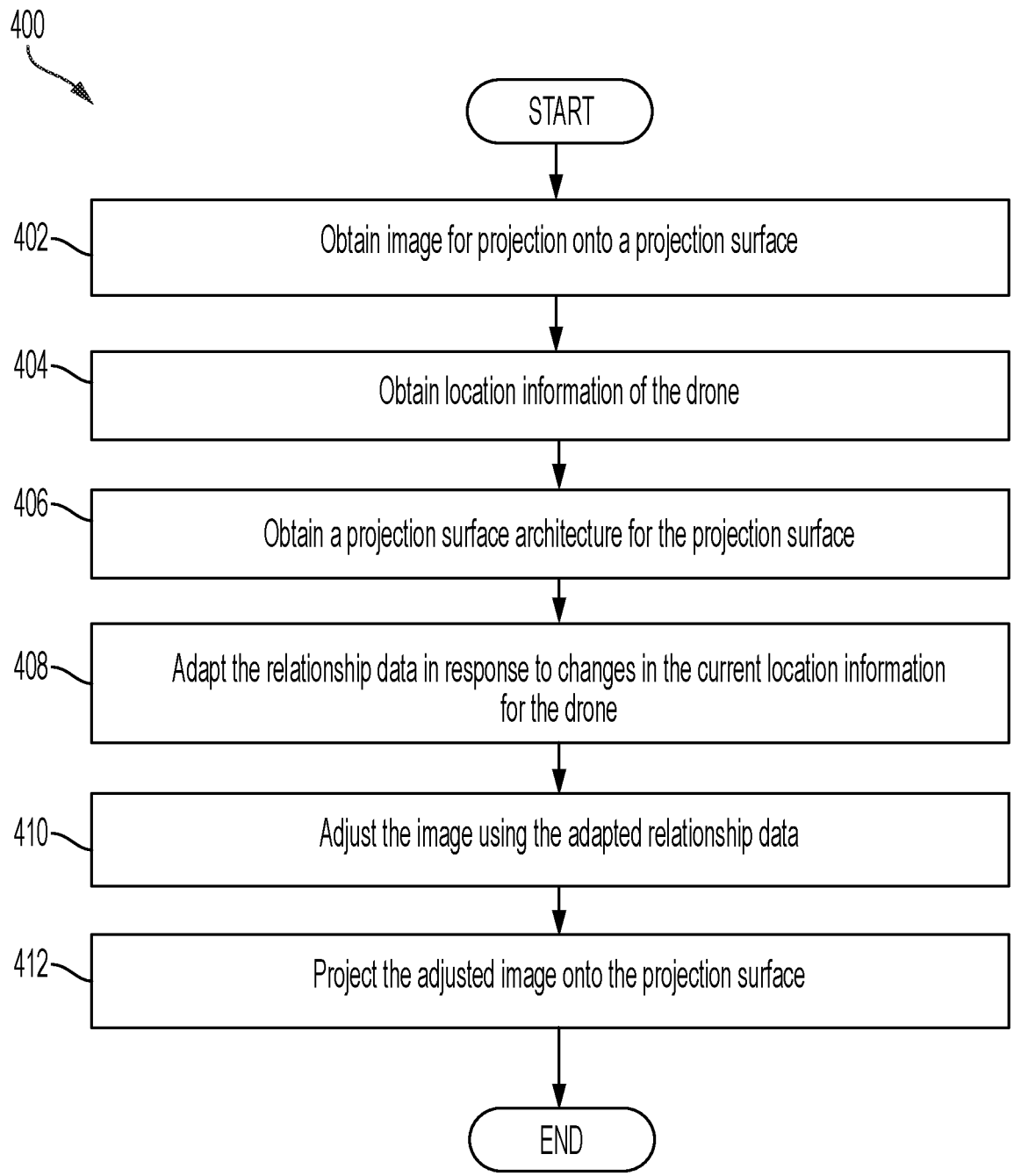
FIG. 4 is a flowchart illustrating an example method for project mapping utilizing a single drone.

FIG. 4 is flow chart 400 illustrating an example method for image projection using a single drone. In one example, processor 108 (FIG. 1) implements the method to project the image using the projection surface architecture generated as describe above with respect to FIG. 2.

At block 402, obtain an image for projection onto a projection surface. The processor 108 may obtain the image from the memory 110.

At block 404, obtain location information of the drone. In one example, the processor 108 may obtain location information from the navigation unit 106. The processor 108 may periodically obtain location information (e.g., every 0.1 second) throughout the projection process. The processor 108 may additionally or alternatively obtain location information by processing known reference points on the projection surface using computer vision software.

At block 406, obtain a projection surface architecture for the projection surface. The processor 108 may obtain/retrieve the projection surface architecture from memory 110. In one example, the processor 107 automatically selects and retrieves a projection surface architecture having an architecture origin matching (e.g., within a few feet) the location information obtained at block 404. In another example, a user may manually select the projection surface architecture.

With further reference to FIGS. 3 and 3A, the processor 108 may obtain/retrieve from the memory 110 relationship data corresponding to the projection surface architecture. The processor 108 may obtain the projection surface architecture (including the reference point values 302) and the corresponding relationship data in real time. In one example, the processor 108 instructs the projector 104 to project one or more images from the origin 310 onto the projection surface 300 utilizing the projection surface architecture including the reference points 302 and the corresponding relationship data. The drone 102 may adjust the image for projection onto the projection surface 300 such that the image appears correctly and not distorted. In one example, the processor 108 functions to retrieve the projection surface architecture including the one or more reference points 302 (A-L) for projecting an image from the drone 102 onto the projection surface 300 as described above with reference to FIGS. 3B and 3C.

At block 408, adapt the relationship data responsive to changes in the current location information for the drone. The processor 108 may adapt the relationship data based on the current location information for the drone received from the navigation unit 106 or from computer vision software analysis of known reference points on the projection surface. The relationship data in the projection surface architecture corresponds to an origin for the architecture (e.g., the location of the imager 112 when obtaining the image of the projection surface in block 202 (FIG. 2). In one example, a projection origin associated with current location information of the drone is determined. The processor 108 may then adapt the reference points for the projection surface using the current projection origin (e.g., to generate an updated projection surface architecture) in order to accommodate movement of the drone during projection to reduce/eliminate distortion. Accordingly, processor 108 may determine a change in the relationship data based on the updated/changed projection origin due to the change in the location information for the drone. The change is a difference in the relationship data between the updated projection origin associated with the changed location information for the drone and the projection origin associated with the location information prior to the changed location information.

At block 410, adjust the image using the adapted relationship data. The processor 108 may adjust the image using the adapted relationship data.

At block 412, project the adjusted image onto the projection surface. The processor 108 may project the adjusted image using projector 104. In one example, the adjusted image is projected by the projector 104 from the projection origin associated with the changed location of the drone onto the projection surface. Accordingly, the image projects accurately onto the projection surface with minimal, if any, distortion. The movement of the drone 102 may be unintentional such as caused due to wind. Alternatively, the movement of the drone 102 may be intentional. Subsequent to movement of the drone 102, the processor 108 functions to update the position marker of the origin 310 to 310' associated with the changed location of the drone 102.

Figure 5:
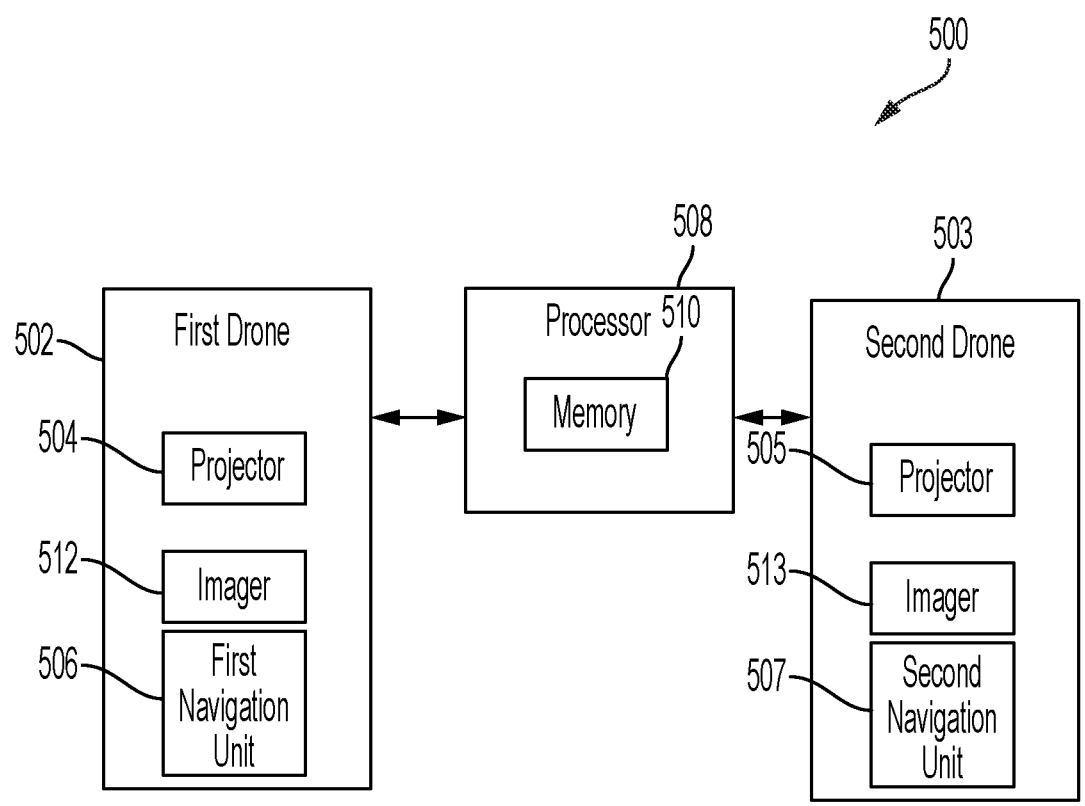
FIG. 5 is a block diagram of an example system for image projection mapping onto a projection surface utilizing two drones.

FIG. 5 is a block diagram of an example system 500 including two drones. Unlike the system 100 of FIG. 1 the system 500 of FIG. 5 includes two drones, i.e., a first drone 502 and a second drone 503. The first and the second drones 502 and 503, respectively, are each similar to the drone 102. In particular, the first drone 502 includes a projector 504 and the second drone 503 includes a projector 505. Both of the projectors 504 and 505 are similar to the projector 104 of FIG. 1. Also, the first drone 502 includes an imager 512 and the second drone 503 includes an imager 513. Both of the imagers 512 and 513 are similar to the imager 112 of FIG. 1.

Figure 10:
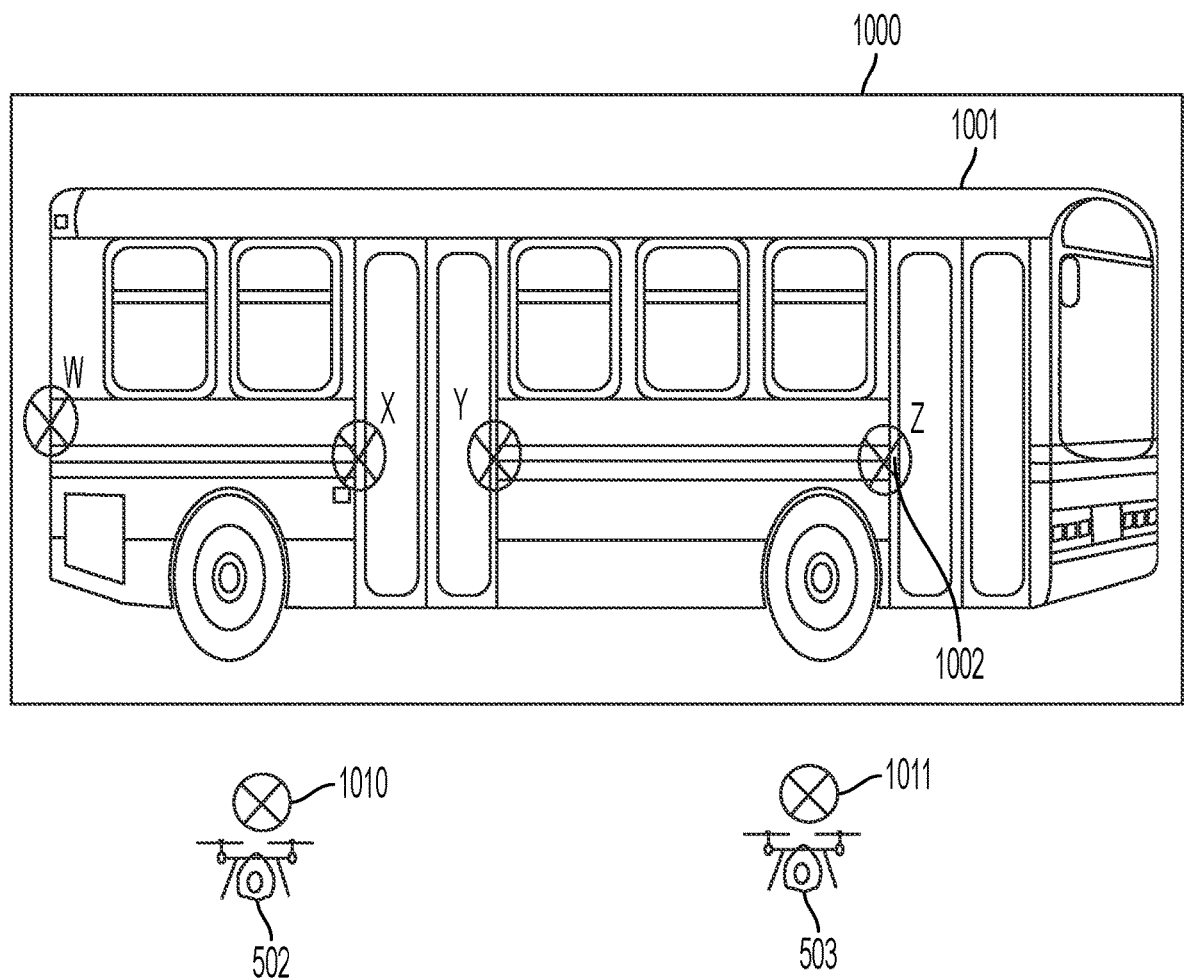
FIG. 10 is an example projection surface architecture on a projection surface of a moving object utilizing two drones.

The imager 512 is configured to capture images and the projector 504 is configured to project images from an origin, e.g., origin 710 (FIG. 7) and/or origin 1010 (FIG. 10), of the projector 504 of the first drone 502 onto a projection surface, e.g., projection surface 700 (FIG. 7) and/or projection surface 1000 (FIG. 10). Similarly, the imager 513 is configured to capture images and the projector 505 is configured to project images from an origin, e.g., origin 711 (FIG. 7) and/or origin 1011 (FIG. 10), of the projector 505 of the drone 503 onto a projection surface, e.g., projection surface 700 (FIG. 7) and/or projection surface 1000 (FIG. 10).

The first drone 502 includes a first navigation unit 506 similar to the navigation unit 106 of FIG. 1. The second drone 503 includes a second navigation unit 507 also similar to the navigation unit 106 of FIG. 1. In one example, the first drone 502 remains stationary and the second drone 503 moves with respect to a stationary projection surface. As such, the relative location of the first drone 502 remains the same with respect to the projection surface and the relative location of the second drone 503 changes with respect to the stationary projection surface. In another example, both the first and the second drones 502 and 503 move with respect to the stationary projection surface. As such, the relative location of both the first and the second drones 502 and 503 changes with respect to the stationary projection surface.

In one example, the first drone 502 and the second drone 503 move with respect to a moving projection surface. As such, the relative location of the first drone 502 and the second drone 503 changes with respect to change in location of the moving projection surface. The system 500 also includes a processor 508 including a memory 510 coupled to the first and second drones 502 and 503, respectively. The processor 508 functions similar to the processor 108 of FIG. 1. Similarly, the memory 510 functions similar to the memory 110 of FIG. 1. In one example, the processor 508 may be a processing system including a first processor in the first drone 502 and a second processor 503 in a second drone that communicate with one another (e.g., one as a master and one as a slave) to provide the functionality described herein. In another example, the processor 508 is a processing system that includes a first processor in the first drone 502, a second processor 503 in a second drone, and a third processor that communicates with the first and second processor to provide the functionality described herein.

Figure 6:
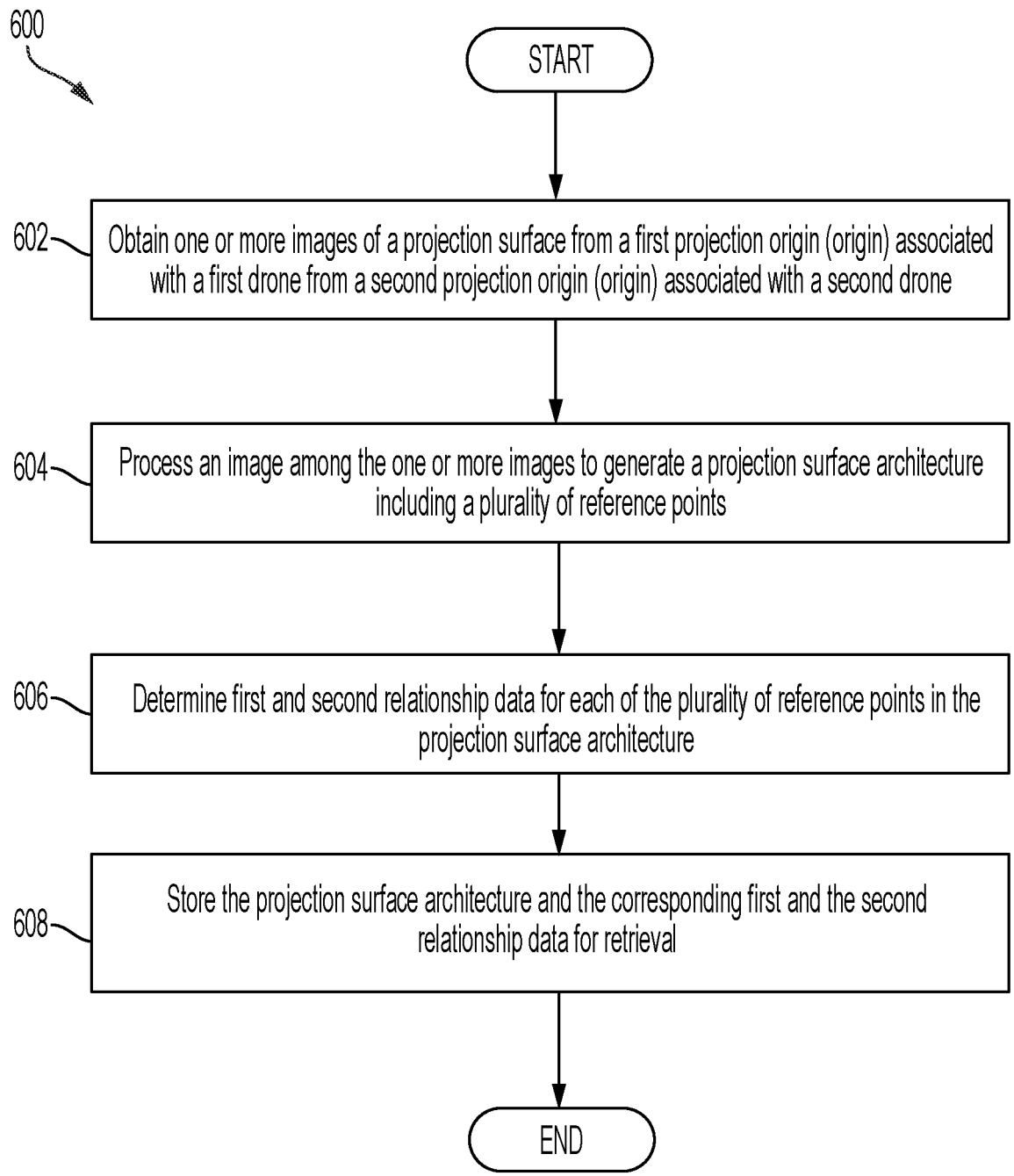
FIG. 6 is a flowchart illustrating an example of generating projection surface architecture for a projection surface utilizing system with two drones.

FIG. 6 is a flow chart 600 illustrating an example method for generating a projection surface architecture for a projection surface in a system with two drones. In one example, the method 600 is implemented by the system 500 of FIG. 5.

At block 602, the system obtains one or more images of the projection surface from the perspective of a first projection origin (origin) associated with a first drone and from the perspective of a second projection origin associated with the second drone. The processor 508 may determine a first projection origin (origin) 710 (FIG. 7) and/or first projection origin (origin) 1010 (FIG. 10) for the imager 512 at the current location of the first drone 502 with respect to the projection surface. Similarly, the processor 508 may be configured to determine a second projection origin (origin) 711 (FIG. 7) and/or second projection origin (origin) 1011 (FIG. 10) for the imager 513 at the current location of the second drone 503 with respect to the projection surface.

In one example, the processor 508 utilizes GPS location information from the first navigation unit 506 and a known offset between the GPS location information and the origin of the projector 504 to determine the first origin. Similarly, the processor 508 may utilize the GPS location from the second navigation unit 507 and a known offset between the GPS location information and the origin of the projector 505 to determine the second origin. In another example, the processor 508 utilizes computer vision software to process a captured image(s) of an area including the projection surface and known reference points on the projection surface to determine the first and the second origins. Similarly, the processor 508 may utilize computer vision software to process other captured image(s) of an area including the projection surface and known reference points on the projection surface to determine the first and the second origins. Suitable computer vision software will be apparent to one of skill in the art from the description herein.

At block 604, the system processes the one or more images to generate a projection surface architecture including a plurality of reference points. The projection surface architecture may be a 2D, 3D, or 4D map of the projection surface. In one example, the processor 508 may process the image by identifying each of the plurality of reference points on the captured image that correspond to physical locations represented by corresponding position markers on the projection surface. Each of the plurality of reference points represent a distinct point that is identifiable and traceable on the projection surface. After identifying each of the plurality of reference points, the processor 508 may create a map of the projection surface illustrating the reference points. In one example, a user manually identifies one or more reference points among the plurality of reference points by selecting them on the image with a user input device. In another example, computer vision software may automatically identify one or more of the reference points. After identifying each of the plurality of reference points, the processor 508 may create a map of the projection surface utilizing the reference points.

Figure 7:
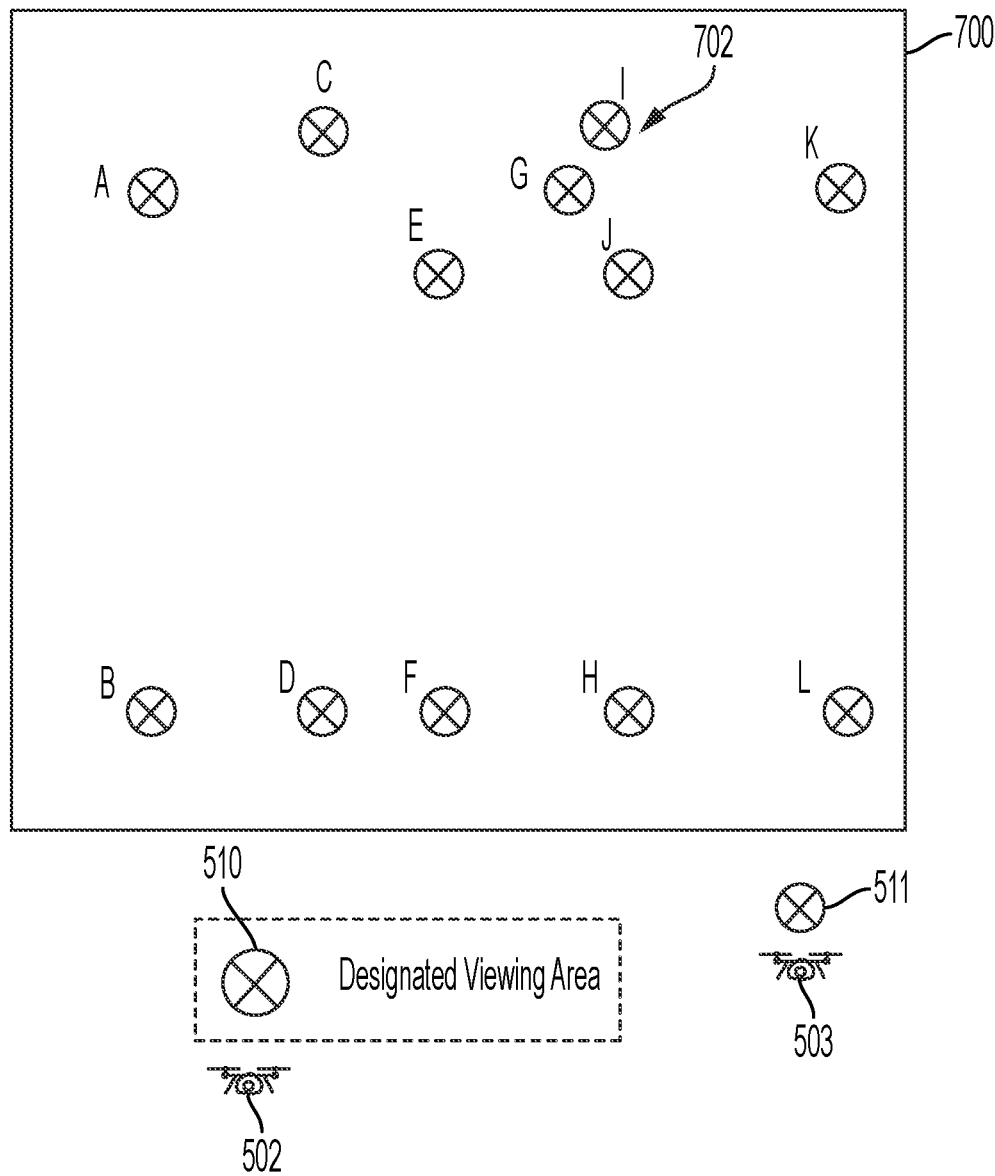
FIG. 7 is an example of a projection surface architecture on a projection surface utilizing two drones.

FIG. 7 illustrates an example of a projection surface architecture on a projection surface 700. The projection surface 700 is similar to the projection surface 300 of FIG. 3 including the distinct reference points 702, e.g., reference points A, B, C, D, E, F, G, H, I, J, K, and L each of which identify a physical location with their corresponding position marker on the projection surface 700 as descried in greater detail above. The first drone 502 may capture one more images of the projection surface with an imager 512 and the processor 508 may develop the projection surface architecture from the one or more of the captured images. In one example, the position marker of each of the reference points 702 represents a distinct angle and distance of projection from an origin position marker. The origin position marker in this example may be the origin 710 of the drone 502. The second drone 503 may capture one more images of the projection surface with an imager 513 and the processor 508 may develop the projection surface architecture from the one or more of the captured images. The origin position marker in this example may be the origin 711 of the second drone 503. Although FIG. 7 illustrates a single projection surface 700, multiple different projection surfaces may be utilized for projection mapping. Also, the projection surface architecture illustrates reference points 702 as specific physical locations on the projection surface 700, multiple different position reference points may be generated for one or more projection surfaces. In one example, multiple different projection surfaces and multiple different projection surface architectures with their corresponding multiple different reference points for each of the multiple different projection surfaces are stored in the memory 510.

Referring back to FIG. 6, at block 606, the system determines relationship data for each of the plurality of reference points in the projection surface architecture. In one example, the relationship data includes a first relationship data and a second relationship data. The processor 508 may determine the first and the relationship data. In one example, the processor 508 utilizes the first navigation unit 506 to determine the first relationship data. The first relationship data may be a distance between architecture origin of each of the first set of reference points and the first origin and/or an orientation of the first drone 502 at the first origin relative to the architecture origin of each of the first set of reference points on the projection surface. The first relationship data may be a combination of the distance and the orientation as described above. In one example, the processor 508 utilizes the second navigation unit 507 to determine the second relationship data. The second relationship data may be a distance between architecture origin corresponding each of the second set of reference points and the second origin and/or an orientation of the second drone 503 at the first origin relative to the architecture origin corresponding to each of the second set reference points on the projection surface. The second relationship data is a combination of the distance and the orientation as described. In one example, the first and the second relationship data are determined in real time. In another example, the first and the second relationship data are determined in a time prior to the real time. The first and the second relationship data may be stored in the memory 510. In one example, the processor 508 utilizes the projector 504 to adjust the image(s) to be projected accurately onto the projection surface 700 based on the first relationship data as described in detail below. In another example, the processor 508 utilizes the projector 505 to adjust the image(s) to be projected accurately onto the projection surface 500 based on the second relationship data as described in detail below.

At block 608, the system stores the projection surface architecture and the corresponding relationship data for retrieval. The processor 508 of the system may store the projection surface architecture and the corresponding first and the second relationship data in the memory 510. The method 600 repeats for each projection surface.

Figure 7A:
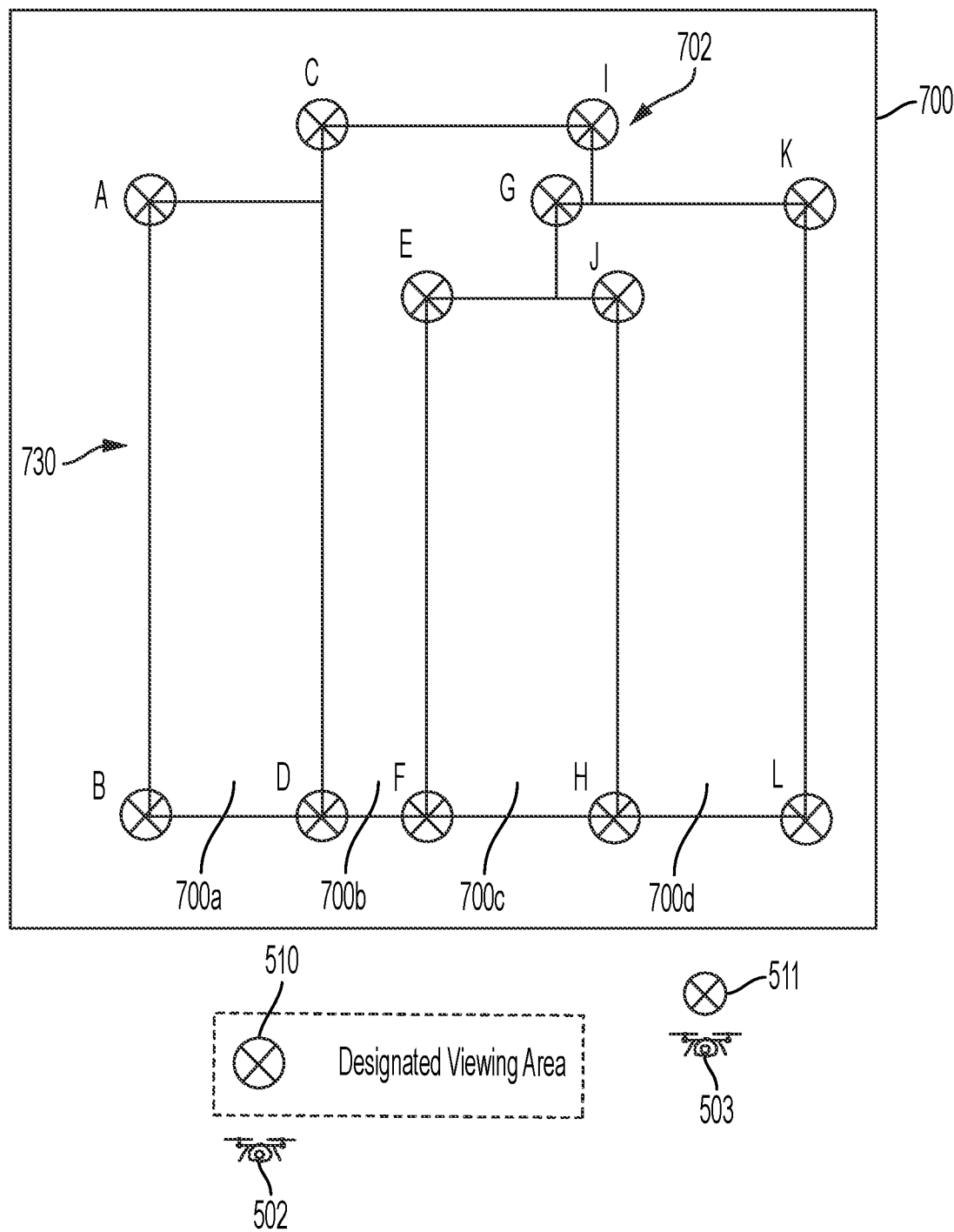
FIG. 7A is an example of reference points on the projection surface architecture of the projection surface of FIG. 7.

FIG. 7A depicts an example outline 730 of the projection surface architecture of the projection surface 700 of FIG. 7. The outline 730 is similar to the outline 330 of FIG. 3A defining an area of the projection surface 700 for projecting one or more images. Specifically, the line 704 is equivalent to the line 304 as described with respect to FIG. 3A above and the four unequal portions 700a, 700b, 700c and 700d are equivalent to the four unequal portions 300a, 300b, 300c and 300d, respectively, as described above with respect to FIG. 3A. In one example, the processor 508 functions to identify a first set of reference points among the distinct reference points 702 (A-L) in order to project a first image among the one or more images from the first drone 702. An example of the first set of reference points 702 are A and B. In another example, the processor 508 functions to identify a second set of reference points among the distinct reference points 702 (A-L) in order to project a second image among the one or more images from the second drone 505. An example of the second set of reference points 702 are B and D.

In one example, the processor 508 functions to identify a projection surface and obtain/retrieve a projection surface architecture (including the first reference points and the second reference points) from memory 510 corresponding to the identified projection surface. Additionally, the processor obtains/retrieves from the memory 110 first and second relationship data corresponding to the projection surface architecture. The processor 508 may obtain projection surface architecture (including the reference points 702) and the corresponding first and the second relationship data in real time. In one example, the processor 508 coordinates the first and the second drones to project the one or more images as described below.

Figure 8:
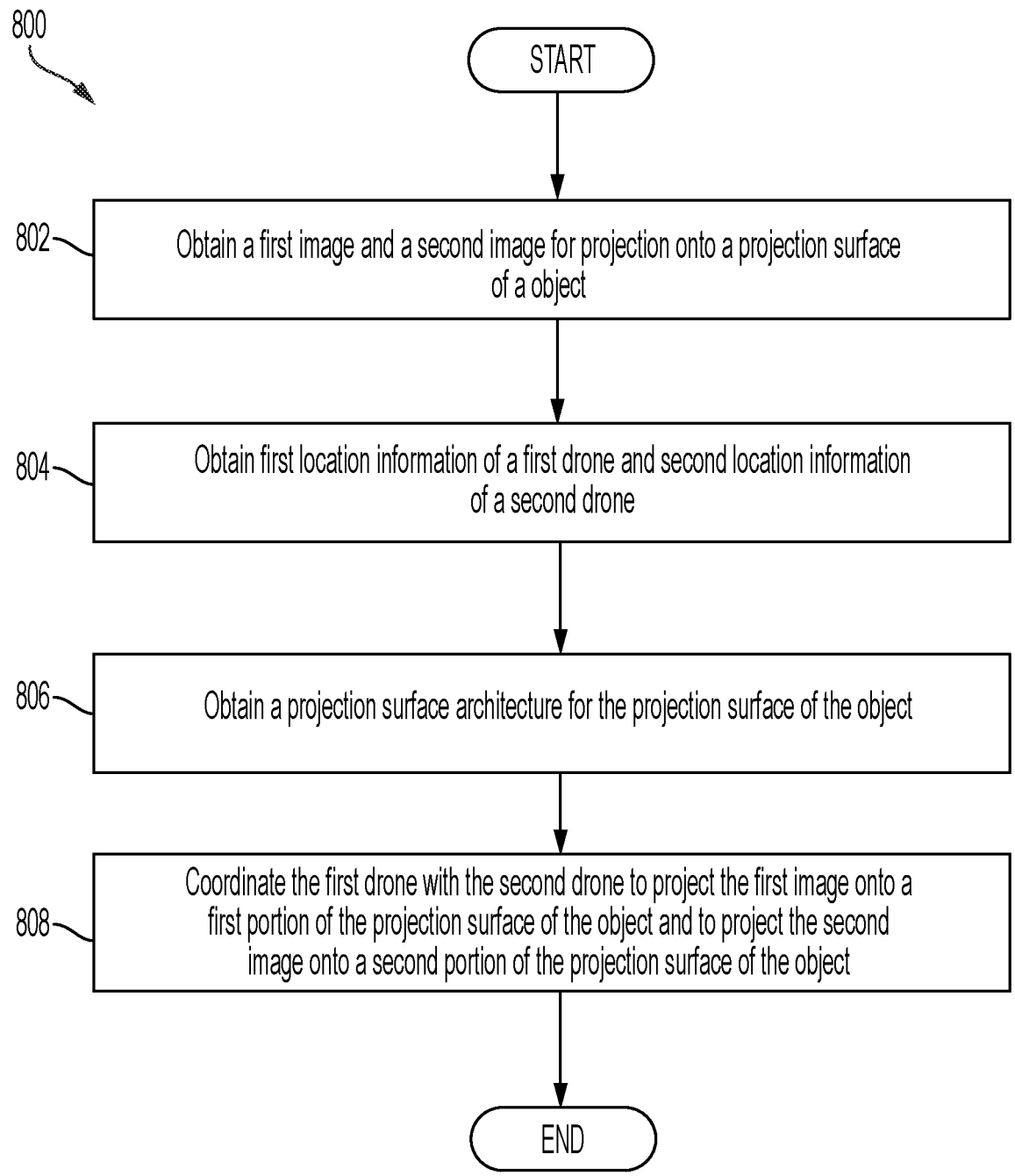
FIG. 8 is a flowchart illustrating an example method for coordinating two drones utilizing the projection surface architecture of the projection surface of FIG. 7.

FIG. 8 is flow chart 800 illustrating an example method for coordinating two drones for image projection. In one example, the processor 508 (FIG. 5) implements that method to project one or more images using the projection surface architecture generated as describe above with respect to FIG. 6.

At block 802, obtain a first and a second image for projection onto a projection surface of an object. In one example, the processor 508 obtains the first and the second images from the memory 510.

At block 804, obtain first location information of a first drone and second location information of a second drone. In one example, the processor 508 obtains the first location information from the first navigation unit 506 and the second location information from the second navigation unit 507. The processor 508 may periodically obtain the first and the second location information (e.g., every 0.1 second) throughout the projection. The processor 108 may additionally or alternatively obtain location information by processing known reference points on the projection surface using computer vision software.

At block 806, obtain a projection surface architecture for the projection surface of the object. The processor 508 may obtain/retrieve the projection surface architecture from memory 510. In one example, the processor may automatically select and retrieve a projection surface architecture having an architecture origin matching (e.g., within a few feet) the first location information obtained at block 804 and an architecture origin matching (e.g., within a few feet) the second location information obtained at block 804. In another example, a user may manually select the projection surface architecture.

At block 808, coordinate the first drone with the second drone to project a first image onto a first portion of the projection surface of the object and to project a second image onto a second portion of the projection surface of the object. In one example, each of the first and the second drones are coordinated to project one or more images using first time stamp information such that each of the first and the second drones projects one or more images onto the projection surface at different times. In another example, each of the first and the second drones are coordinated to project one or more images using second time stamp information such that each of the first and the second drones projects one or more images onto the projection surface at a same time.

With reference to FIGS. 7 and 7A, the processor obtains/retrieves from the memory 510 first and second relationship data corresponding to the projection surface architecture of the projection surface 700. The processor 508 may obtain the projection surface architecture (including the reference points 702) and the corresponding first and the second relationship data in real time. The processor 508 instructs the projector 504 to project a first image among the one or more images from the origin 710 onto the projection surface 700 utilizing the projection surface architecture including the first set of reference points among the reference points 702. The processor 508 may also instruct the projector 505 to project a second image among the one or more images from the origin 711 onto the projection surface 700 utilizing the projection surface architecture including the second set of reference points among the reference points 702 as described below.

Figure 7B:
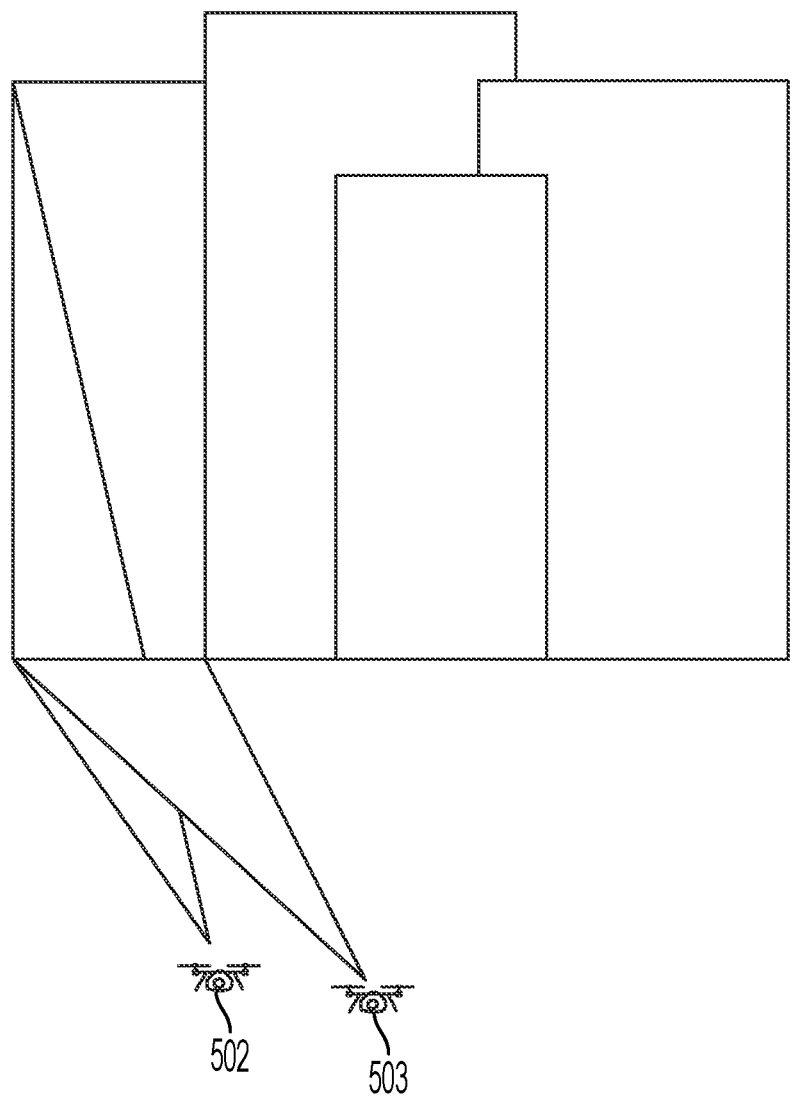
FIG. 7B is an example of boundaries of projections onto the projection surface architecture of the projection surface of FIG. 7 and angle of projection of the two drones.

In one example, the first set of reference points among the distinct reference points 702 include A and B and the second set of reference points among the distinct reference points 702 include B and D. In one example, upon instructions from the processor, 508, the projector 504 in the first drone 502 projects the first image from the origin position marker of the first origin 510 onto the first set of reference points A and B of the projection surface 700 as shown in FIG. 7B. In another example, upon instructions from the processor 508, the projector 505 in the second drone 503 projects a second image from the origin position marker of the origin 511 onto second set of reference points B and D as shown in FIG. 7B. In one example, the first and the second image are part of the same image such that the image is a continuous image of the first and the second image. As such a projection of the image may begin with projecting the first image onto the reference points A and B, and may continue with projecting of the second image onto the reference points B and D of the projection surface 700 such that image is spread accurately without any distortion during projection. In another example, the first image and the second image are not part of the same image such that the first and the second image are projected separately onto the projection surface 700 without any distortion during projection. In one example, the first image projects on background of the projection surface 700. In another example, the second image projects on a foreground of the projection surface 700. In one example, the first image and the second images are projected based on the first time stamp information such the first and the second images are projected at different times. In another example, the first image and the second images are projected based on the second time stamp information such the first and the second images are projected at the same time.

Figure 7C:
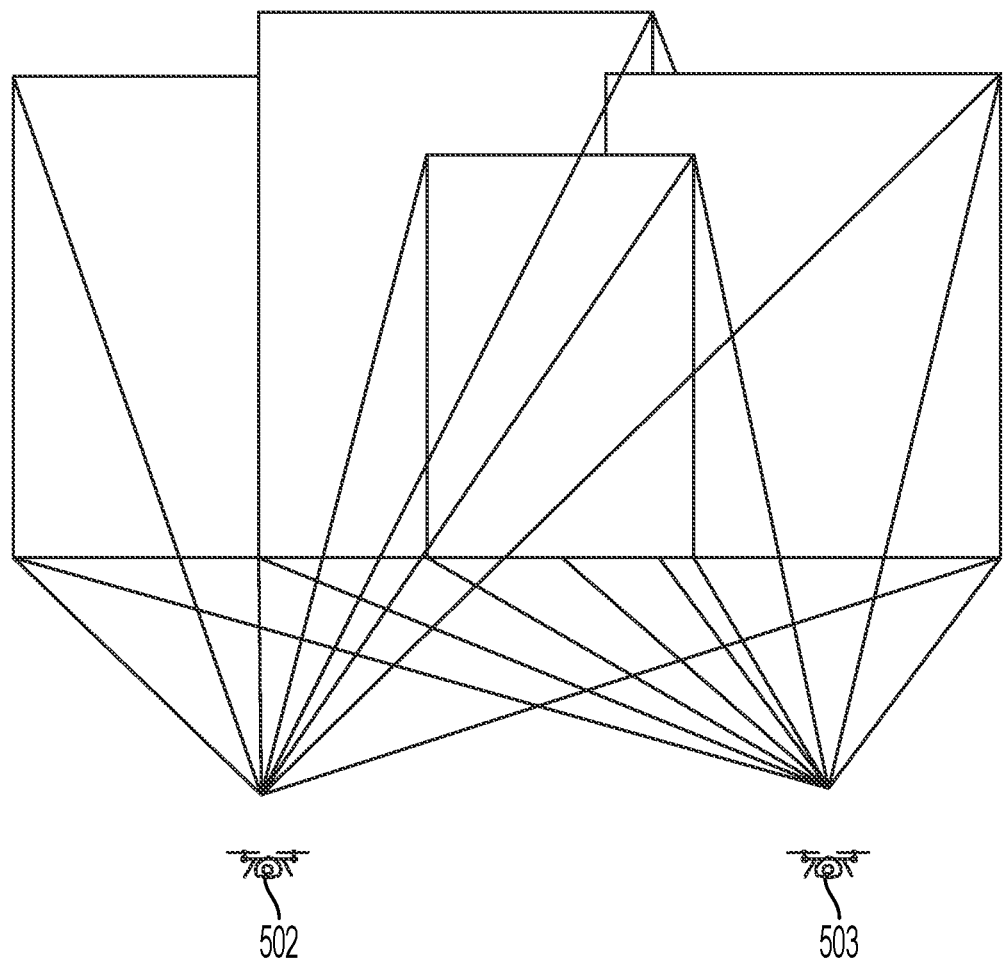
FIG. 7C is another example of boundaries of projections onto the projection surface architecture of the projection surface of FIG. 7 and angles of projection of the two drones.

Referring back to FIG. 7A, in one example, the first set of reference points among the distinct reference points 702 include A, B, C, E, F, I, J, K and L and the second set of reference points among the distinct reference points 702 include B, C, D, E, F, I, J, K and L. In one example, upon instructions from the processor 508, the projector 504 in the first drone 502 functions to project the first image from the origin position marker of the first origin 510 onto the first set of reference points A, B, C, E, F, I, J, K and L such that the image is properly aligned and presented with respect to the first set of reference points of the projection surface 700 as shown in FIG. 7C. In another example, upon instructions from the processor 508, the projector 505 in the second drone 503 functions to project a second image from the origin position marker of the origin 511 onto second set of reference points B, C, D, E, F, I, J, K and L such that the image is properly aligned and presented with respect to the second set of reference points of the projection surface 700 as shown in FIG. 7C. In one example, the first image is a continuation of the first image in FIG. 7B. In another example, the second image is a continuation of the second image in FIG. 7B.

In one example, the first and the second images are part of the same image such that the image is a continuous image of the first and the second image. As such, a projection of the image may begin with projecting the first image onto the reference points A, B, C, E, F, I, J, K and L and may continue with projecting of the second image onto the reference points B, C, D, E, F, I, J, K and L of the projection surface 700 such that image is spread accurately without any distortion during projection.

In one example, the first image is projected from the first origin point 710 of the first drone 502 onto one or more portions 700a, 700b, 700c and 700d of the projection surface 700. For example, the one or more portions are the portions 700a and 700b. In another example, the second image is projected from the second origin point 711 of the second drone 505 onto another one or more portions 700a, 700b, 700c and 700d different from the one or more portions 700a, 700b, 700c and 700d onto which the first image from the first origin point 710 is projected. For example, the one or more portions are the portions 700c and 700d. In one example, projection surface 700 is a combination of a foreground and background of a stationary object. In another example, projection surface is a combination of a foreground and background of a moving object. In one example, the processor 508 adjusts the one or more images for projection onto the projection surface 700 of a stationary object such that the image appears correctly and not distorted during projection as described below with respect to FIGS. 9A and 9B.

Figure 9A:
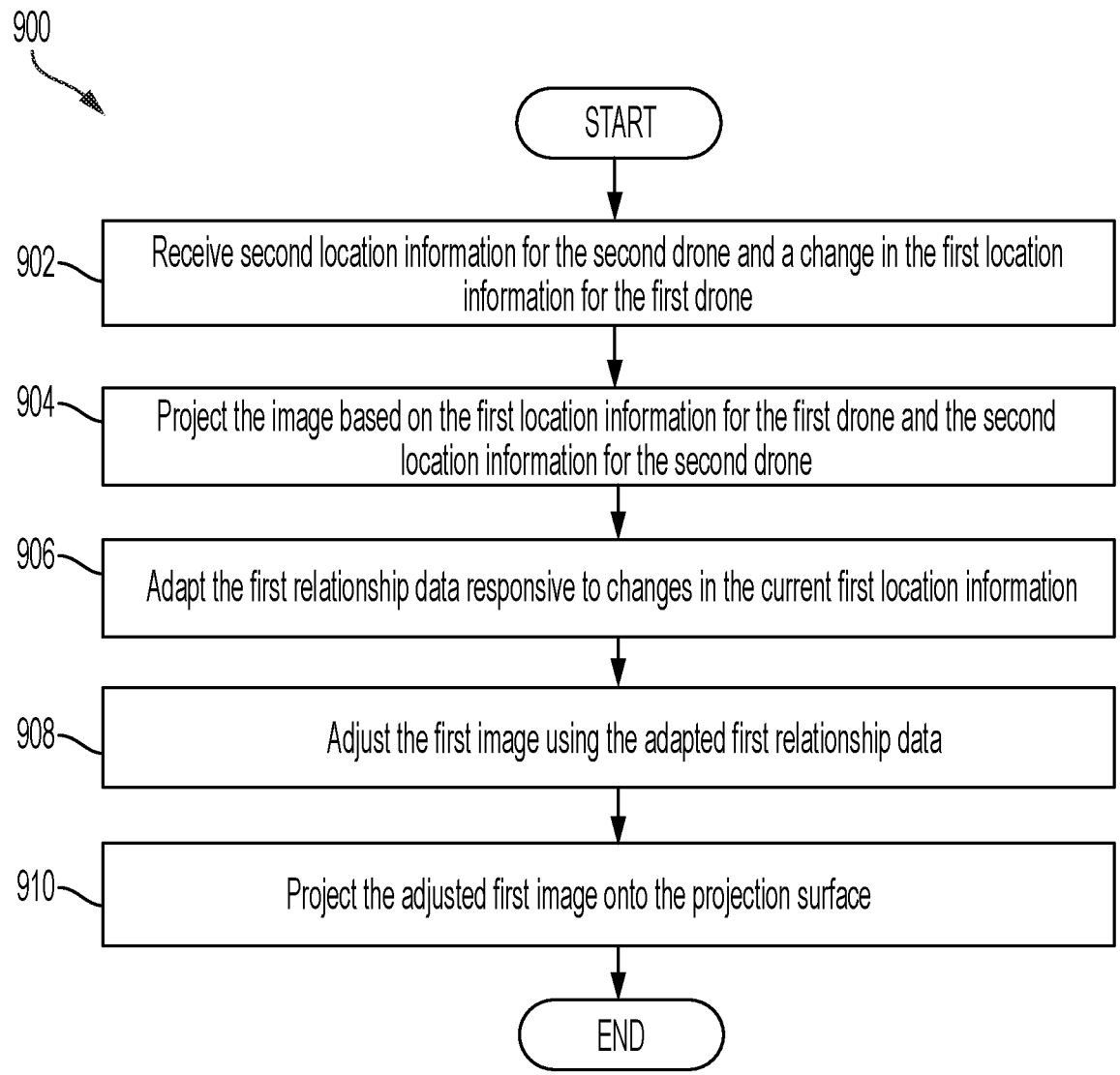
FIG. 9A is a flowchart illustrating an example method for project mapping utilizing two drones onto the projection surface architecture of the projection surface of FIG. 7.

FIG. 9A is flow chart 900 illustrating an example method of image projection onto a stationary object using the two drones such that one of the two drones move at a time. In one example, processor 508 (FIG. 5) implements that method to project one or more images using the projection surface architecture generated as describe above with respect to FIG. 6 and using the coordination of the first and the second drone as described above with respect to FIG. 8.

At block 902, receive second location information for the second drone and a change in the first location information for the first drone. In one example, processor 508 obtains the second location information and the change in the first location information from the first navigation unit 506. The processor 508 may periodically obtain the second location information (e.g., every 0.1 second) from the second navigation unit 507 throughout the projection process. The processor 508 may also periodically obtain the change in the first location information (e.g., every 0.1 second) from the first navigation unit 506 throughout the projection process. The processor 108 may additionally or alternatively obtain location information by processing known reference points on the projection surface using computer vision software.

At block 904, project the image based on the first location information for the first drone and the second location information for the second drone. The processor 508 may project the adjusted image using projectors 504/505.

At block 906, adapt the first relationship data responsive to changes in the current first location information. The processor 508 may adapt the first relationship data based on the current first location information for the first drone received from the first navigation unit 506 or from computer vision software analysis of known reference points on the projection surface. The first relationship data in the projection surface architecture corresponds to a first projection origin for the architecture (e.g., the location of the imager 512 when obtaining the first image of the projection surface in block 802 (FIG. 8). In one example, a first projection origin associated with the current changed first location information of the first drone is determined. The processor 508 may then adapt the first set of reference points for the projection surface using the current first projection origin (e.g., to generate an updated projection surface architecture) in order to accommodate movement of the first drone during projection and reduce/eliminate distortion. Accordingly, processor 508 may determine a change in the first relationship data based on the updated/changed first projection origin due to the change in the first location information for the first drone. The change is a difference in the first relationship data between the updated first projection origin associated with the changed first location information for the first drone and the first projection origin associated with the changed first location information prior to the changed first location information.

At block 908, adjust the first image using the adapted first relationship data. The processor 508 may adjust the first image using the adapted first relationship data. At block 910, project the adjusted first image onto the projection surface. The processor 508 may project the adjusted first image using the projector 504. In one example, the adjusted first image is projected by the projector 504 from the projection origin associated with the changed location of the first drone onto the projection surface. Accordingly, the first image is projected accurately onto the projection surface with little or no distortion.

Figure 9B:
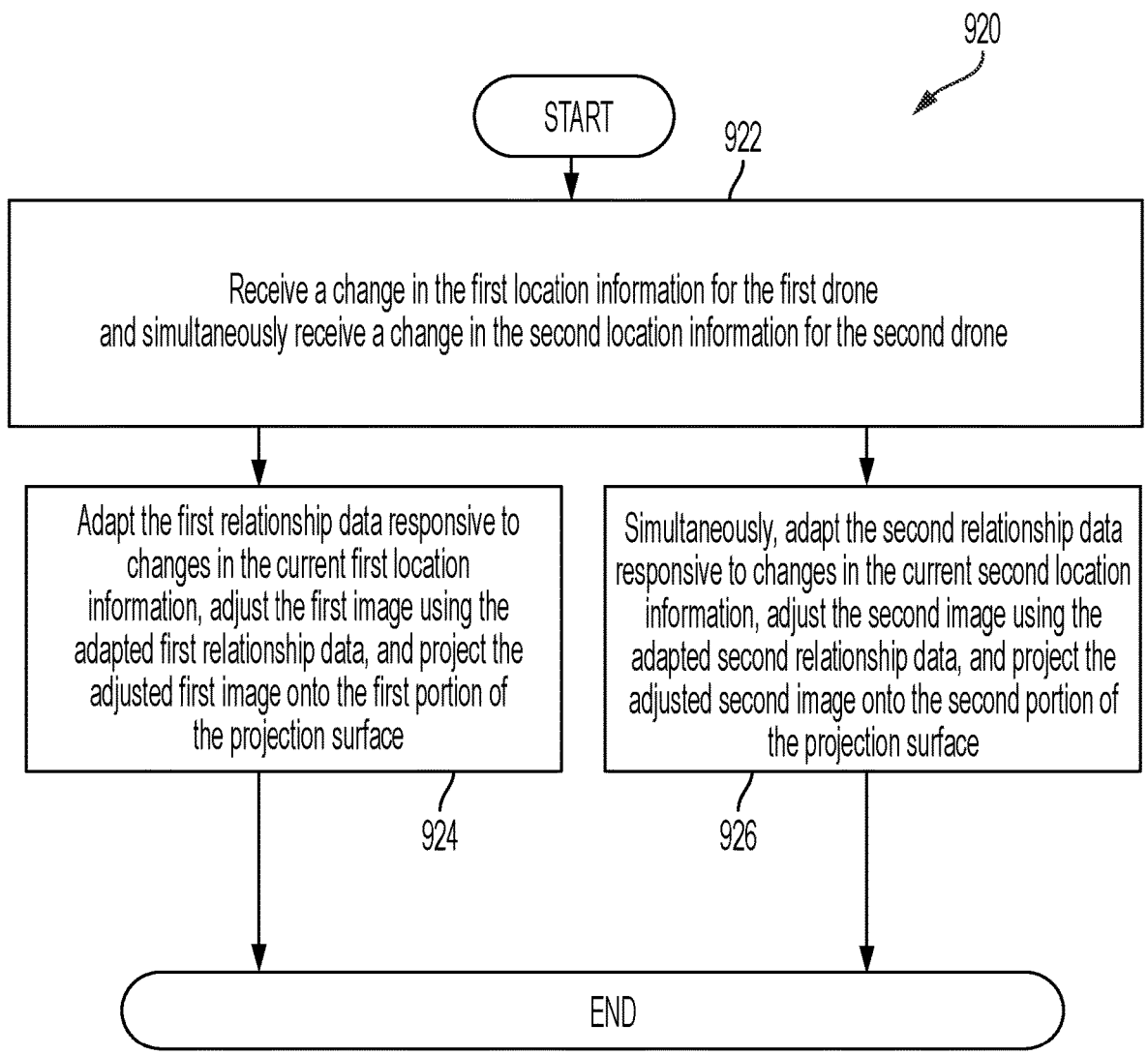
FIG. 9B is flowchart illustrating another example method for project mapping utilizing two drones onto the projection surface architecture of the projection surface of FIG. 7.

FIG. 9B is flow chart 920 illustrating one example method of image projection on a stationary object using the two drones such that the two drones move at the same time. In one example, processor 508 (FIG. 5) implements that method to project one or more images using the projection surface architecture generated as describe above with respect to FIG. 6 and using the coordination of the first and the second drone as described above with respect to FIG. 8.

At block 922, receive a change in the first location information for the first drone and simultaneously (e.g., at the same time or close to the same time, e.g., within a second) receive a change in the second location information for the second drone. In one example, processor 508 obtains the change in the first location information and the change in the second location information from the navigation unit 506. The processor 508 may periodically obtain the change in the first location information (e.g., every 0.1 second) throughout the projection process. The processor 508 may also periodically obtain the change in the second location information (e.g., every 0.1 second) throughout the projection process. At block 924, adapt the first relationship data responsive to changes in the current first location information, adjust the first image using the adapted first relationship data, and project the adjusted first image onto the first portion of the projection surface.

The processor 508 may adapt the first relationship data based on the current first location information for the first drone received from the first navigation unit 506. The first relationship data in the projection surface architecture corresponds to a first projection origin for the architecture (e.g., the location of the imager 512 when obtaining the first image of the projection surface in block 802 (FIG. 8). In one example, a first projection origin associated with the current changed location information of the first drone is determined. The processor 508 may then adapt the first set of reference points for the projection surface using the current first projection origin (e.g., to generate an updated projection surface architecture) in order to accommodate movement of the first drone during projection and reduce/eliminate distortion. Accordingly, processor 508 may determine a change in the first relationship data based on the updated/changed first projection origin due to the change in the first location information for the first drone. The change is a difference in the first relationship data between the updated first projection origin associated with the changed first location information for the first drone and the first projection origin associated with the changed first location information prior to the changed first location information.

The processor 508 may adjust the first image using the adapted first relationship data. The processor 508 may project the adjusted first image using the projector 504. In one example, the adjusted first image is projected by the projector 504 from the projection origin associated with the changed location of the first drone onto the projection surface. Accordingly, the first image is projected accurately onto the projection surface with minimal if any distortion.

At block 926, simultaneously (with respect to the step of block 924) adapt the second relationship data responsive to changes in the current second location information, adjust the second image using the adapted second relationship data, and project the adjusted second image onto the second portion of the projection surface. The processor 508 may adapt the second relationship data based on the current second location information for the second drone received from the second navigation unit 507. The second relationship data in the projection surface architecture corresponds to a second projection origin for the architecture (e.g., the location of the imager 513 when obtaining the second image of the projection surface in block 802 (FIG. 8). In one example, a second projection origin associated with the current changed location information of the second drone is determined. The processor 508 may then adapt the second set of reference points for the projection surface using the current second projection origin (e.g., to generate an updated projection surface architecture) in order to accommodate movement of the second drone during projection and reduce/eliminate distortion. Accordingly, processor 508 may determine a change in the second relationship data based on the updated/changed second projection origin due to the change in the second location information for the second drone. The change is a difference in the second relationship data between the updated second projection origin associated with the changed second location information for the second drone and the second projection origin associated with the changed second location information prior to the changed second location information.

The processor 508 may adjust the second image using the adapted second relationship data. The processor 508 may project the adjusted second image using the projector 505. In one example, the adjusted second image is projected by the projector 505 from the projection origin associated with the changed location of the second drone onto the projection surface. Accordingly, the second image is projected accurately onto the projection surface with little or no distortion. In one example, the adjusted first image and the adjusted second image are stored in the memory 510. Accordingly, several different images may be generated for various locations of the first and the second drones 502 and 503 respectively due to simultaneous movement of the first and the second drones 502 and 503, respectively. In one example, the several different images are projected onto the projection surface 700 based on the corresponding locations of the first and the second drones 502 and 503, respectively.

FIG. 10 illustrates an example of a projection surface architecture on a projection surface 1000 of a moving object 1001 (e.g., bus). The projection surface 1000 includes distinct reference points 1002, e.g., reference points W, X, Y, and Z each of which identify a physical location with their corresponding position marker on the projection surface 1000. The first drone 502 may capture one or more images of the projection surface with an imager 512 and the processor 508 may develop the projection surface architecture from the one or more of the captured images. In one example, the position marker of each of the reference points 1002 represents a distinct angle and distance of projection from an origin position marker. The origin position marker in this example may be the origin 1010 of the first drone 502. The second drone 503 may capture one or more images of the projection surface with the imager 513 and the processor 508 may develop the projection surface architecture from the one or more of the captured images. The origin position marker in this example may be the origin 1011 of the second drone 503. Although, a single projection surface 1000 is illustrated in FIG. 10, multiple different projection surfaces may be utilized for projection mapping. Also, the projection surface architecture illustrates reference points 1002 as specific physical locations on the projection surface 700, multiple different position reference points may be generated for one or more projection surfaces. In one example, multiple different projection surfaces and multiple different projection surface architectures with their corresponding multiple different reference points for each of the multiple different projection surfaces are stored in the memory 510.

In one example, the processor 508 functions to identify a first set of reference points among the distinct reference points (W, X, Y, Z) in order to project a first image among the one or more images from the first drone 502. An example of the first set of reference points are all of the distinct reference points, i.e., W, X, Y, and Z. In another example, the processor 508 functions to identify a second set of reference points among the distinct reference points 1002 (W, X, Y, Z) in order to project a second image among the one or more images from the second drone 505. An example of the second set of reference points 1002 are W, Y and Z.

In one example, the processor 508 identifies a projection surface and obtain/retrieve projection surface architecture (including the first reference points and the second reference points) from the memory 510 corresponding to the identified projection surface. Additionally, the processor 508 obtains/retrieves from the memory 510 first and second relationship data corresponding to the projection surface. The processor 508 may obtain projection surface architecture (including the reference points 1102) and the corresponding first and the second relationship data in real time. In one example, the processor 508 functions to instruct the projector 504 to project a first image among the one or more images from the origin 1010 onto the projection surface 1000 utilizing the projection surface architecture including the first set of reference points among the reference points 1002. In another example, the processor 508 functions to instruct the projector 505 to project a second image among the one or more images from the origin 1011 onto the projection surface 1000 utilizing the projection surface architecture including the second set of reference points among the reference points 1002 as described below.

Figure 10A:
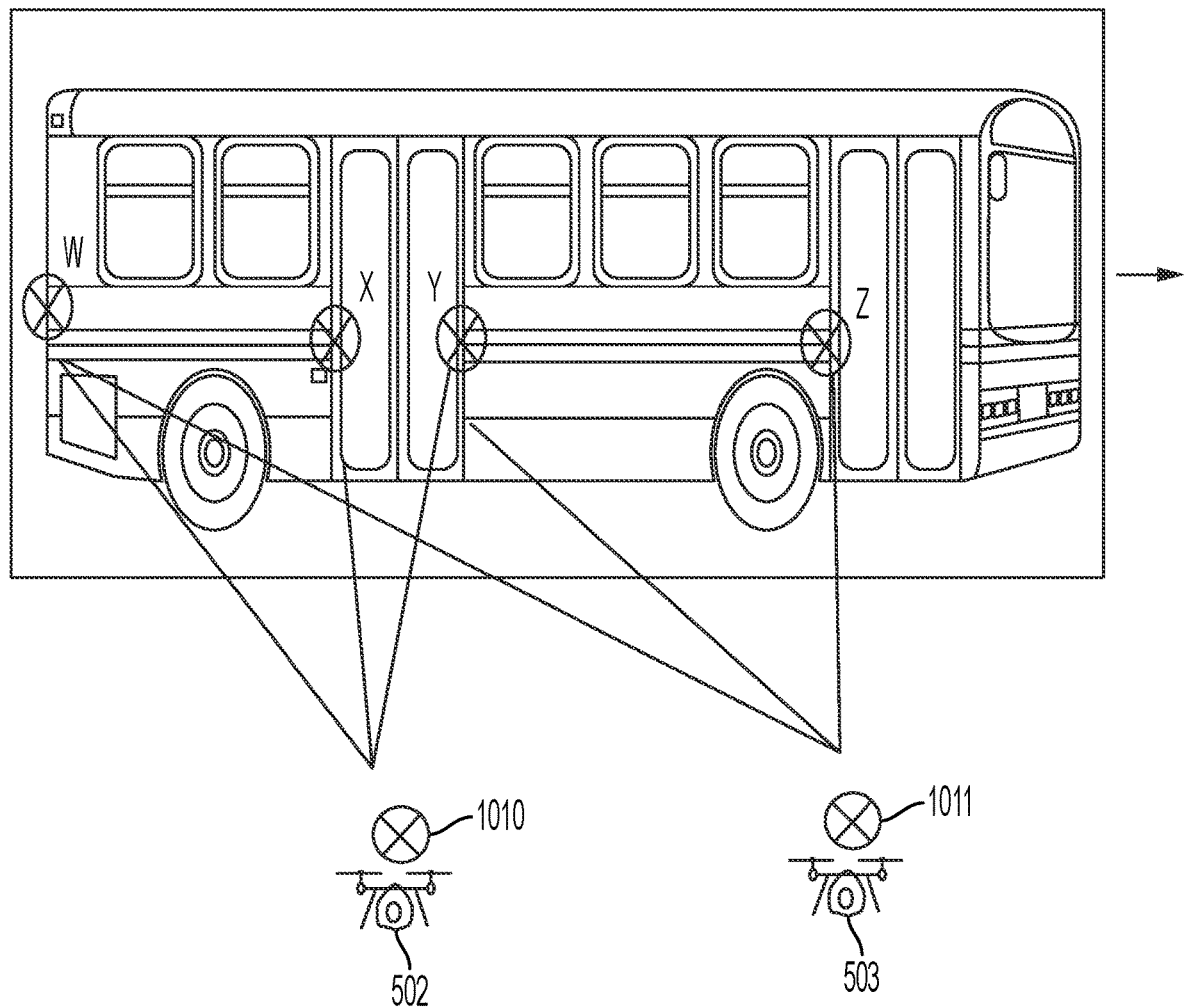
FIG. 10A is an example of boundaries of projections onto the projection surface architecture of the projection surface of FIG. 10 and angles of projection of the two moving drones.

Upon instructions from the processor 508, the projector 504 in the first drone 502 may project the first image from the origin position marker of the first origin 1010 onto a first set of reference points W, X, Y and Z of the projection surface 1000 as shown in FIG. 10A. Additionally, upon instructions from the processor 508, the projector 505 in the second drone 503 may project a second image from the origin position marker of the origin 1011 onto a second set of reference points W, Y and Z as shown in FIG. 10A. In one example, the first and the second images are part of the same image such that the image is a continuous image including the first and the second images. In another example, the first and the second image are not part of the same image, e.g., a first image may be a background image and the second image may be a foreground image. In one example, the first image and the second images are projected based on the first time stamp information such the first and the second images are projected at different times. In another example, the first image and the second images are projected based on the second time stamp information such the first and the second images are projected at the same time.

Figure 10B:
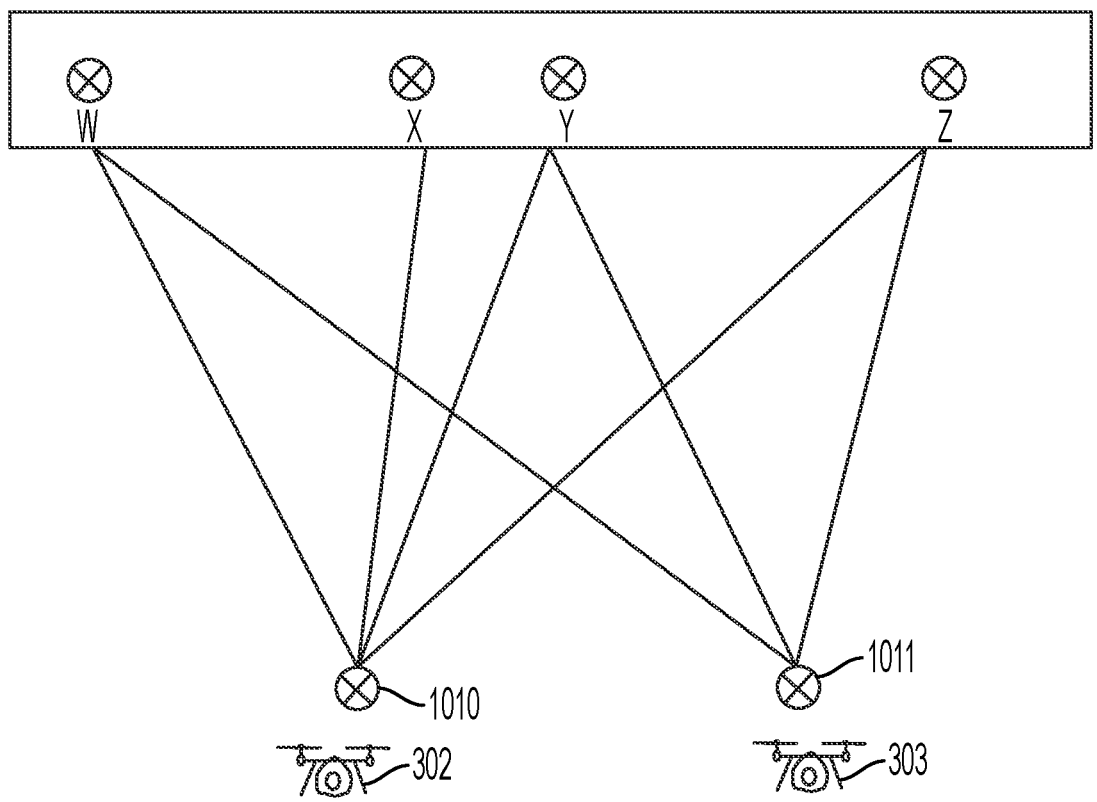
FIG. 10B is another example of boundaries of projections onto the projection surface architecture of the projection surface of FIG. 10 and angles of projection of the two moving drones.

FIG. 10B illustrates the boundary of projection of the one or more images from the first drone 502 onto the first set of reference points (W, X, Y, Z) and from the second drone 503 onto the second set of reference points (W, Y, Z) of the projection surface 1000 without the moving object 1001.

Figure 10C:
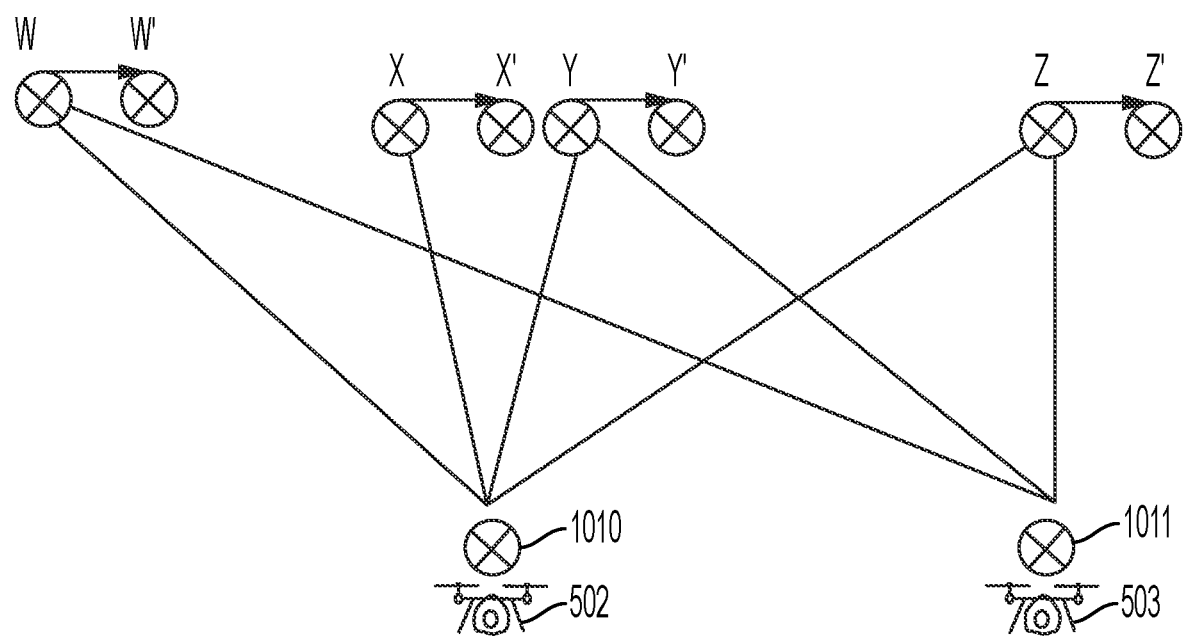
FIG. 10C is a further example of boundaries of projections onto the projection surface architecture of the projection surface of FIG. 10 and angles of projection of the two moving drones.

Referring back to FIG. 10A, a direction of movement of the moving object 1001 is illustrated in the direction shown by an arrow. In one example, the first navigation unit 506 and/or the second navigation unit 507 determine a change in the location of the moving object 1001 based on the speed of the moving object 1001 and the direction of the movement of the moving object 1001 to the processor 508. In another example, a navigation system is located in the moving object 1001 that determines the speed and the direction of the movement of the moving object 1001 and communicates the speed and direction of the movement of the moving object 1001 to the processor 508. FIG. 10C illustrates a change in the location of the reference points 1002 (W, X, Y, Z) on the projection surface 1000 based on the speed and the direction of the movement of the moving object 1001. As shown, reference points 1002' (W', X', Y' Z') represent the changed location of each of the reference points 1002 (W, X, Y, Z) on the projection surface 1000 due to movement of the moving object 1001 in the direction shown by the arrow. In one example, processor 508 communicates both the direction and the speed of the object 1001 to the first and the second drones 502 and 503, respectively. In another example, each of the first and the second drones 502 and 503, respectively, include an iterative predictor to predict speed and direction of the moving object 1001.

As discussed above, the processor 508 functions to obtain/retrieve from the memory 510, the projection surface architecture (including the reference point values 1002) and the corresponding relationship data, including the first and the second relationship data, corresponding to the projection surface architecture of the projection surface (ex. projection surface 1000) it is to project image. In one example, the processor 508 functions to adjust one or more images projected by the first and the second drones 502 and 503 respectively to compensate for the speed and/or direction of the moving object 1001 such that the image appears correctly and not distorted during projection as described in detail below with respect to FIG. 11.

Figure 11:
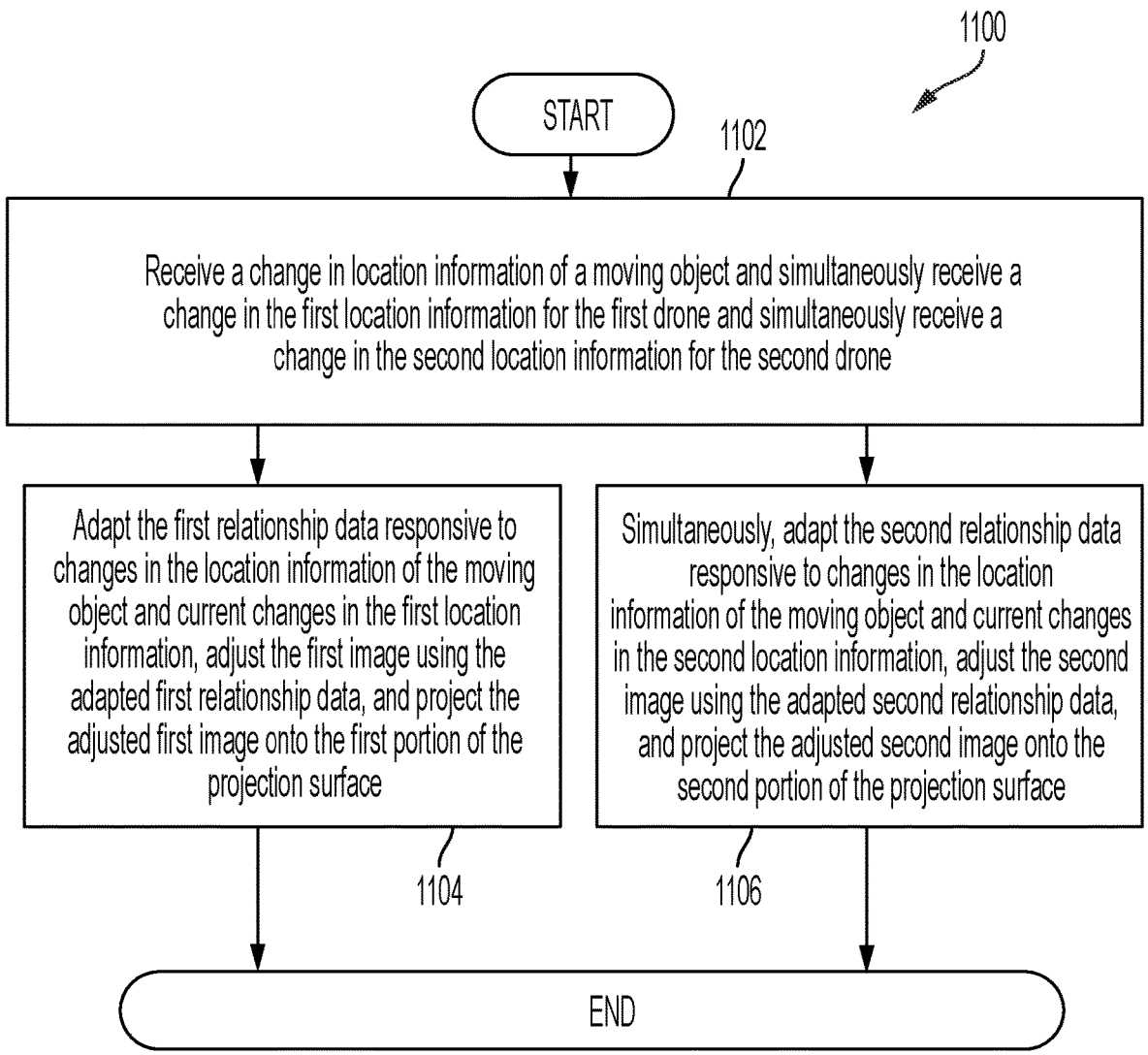
FIG. 11 is a flow chart illustrating another example method for project mapping onto a moving object utilizing two drones onto the projection surface architecture of the projection surface of FIG. 10.

FIG. 11 is flow chart 1100 illustrating an example method for image projection on a moving object using the two drones such that both the drones move with respect to the moving object. In one example, the processor 508 (FIG. 5) implements that method to project one or more images are projected using the projection surface architecture generated as describe above with respect to FIG. 6 and using the coordination of the first and the second drone as described above with respect to FIG. 8.

At block 1102, receive a change in location information for the moving object and simultaneously receive a change in the first location information for the first drone and a change in the second location information for the second drone. In one example, the first and the second drones 502 and 503, respectively, move simultaneously with the moving object 1001 at the same speed and in the same direction as the moving object 1001. In another example, the first and/or the second drones 502 and 503 respectively, move faster or slower than the moving object 1001. The first and/or the second drones 503 may move around the projection surface. Accordingly, the first and the second navigation units 506 and 507 may each determine changes in locations of the respective first and the second drones 502 and 503 taking into account the change in location of the moving object 1001. In one example, the first and/or the second drones 502 and 503 respectively remain in a position that is optimum for projection. For example, the first and/or the second drones 502 and 502 respectively may project on one side of the moving object 1001 and due to change in direction of the moving object 1001, the first and/or the second drones 502 and 503 respectively may move to an opposite side of the moving object 1001 for projection. In another example, the first and/or the second drones 502 and 503 respectively project in a position and/or move in a direction for aesthetic reasons.

At block 1104, adapt the first relationship data responsive to changes in the location information for the moving object and the current changes in the first location information, adjust the first image using the adapted first relationship data, and project the adjusted first image onto the first portion of the projection surface. At block 1106, simultaneously (with respect to block 1104) adapt the second relationship data responsive to changes in the location information for the moving object and the current changes in the second location information, adjust the second image using the adapted second relationship data, and project the adjusted second image onto the second portion of the projection surface. In one example, the adjusted first image is projected onto the projection surface of the moving object by the projector from the projection origin associated with the current changed location of the first drone and simultaneously the adjusted second image is projected by the projector onto the projection surface of the moving object from the projection origin associated with the current changed location of the second drone. Accordingly, the first image and the second image are projected accurately onto the projection surface without any distortion. In one example, the adjusted first and second images are different images. In another example, the adjusted first and the second images are part of a continuous image. In one example, the adjusted first image and the adjusted second image are stored in the memory 510. Accordingly, several different images may be generated for various locations of the object 1001 due to movement of the moving object 1001, along with the various corresponding locations of the first and the second drones 502 and 503 respectively due to simultaneous movement of the first and the second drones 502 and 503, respectively. In one example, the several different images are projected onto the projection surface 1000 based on the corresponding locations of the moving object 1001 and the corresponding locations of the first and the second drones 502 and 503, respectively.

In one example, the adjusted first and second images are different images. In another example, the adjusted first and the second images are part of a continuous image.

Figure 12:
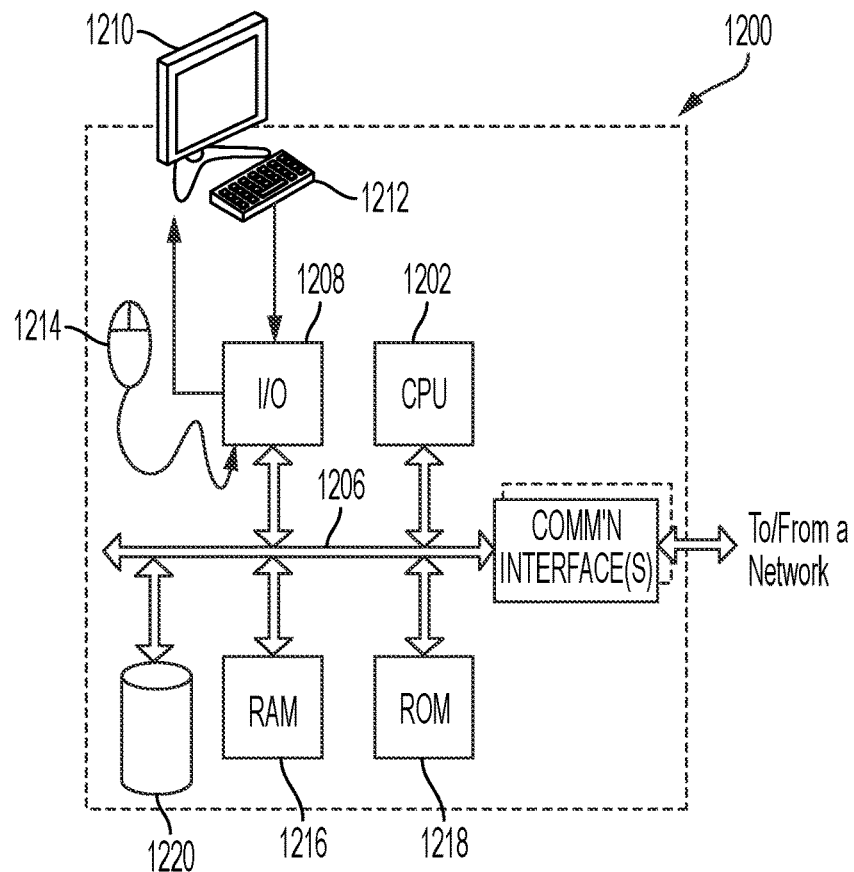
FIG. 12 is a functional block diagram illustrating a general-purpose computer hardware platforms configured to implement the functional examples described with respect to FIGS. 1-11.
Figure 13:
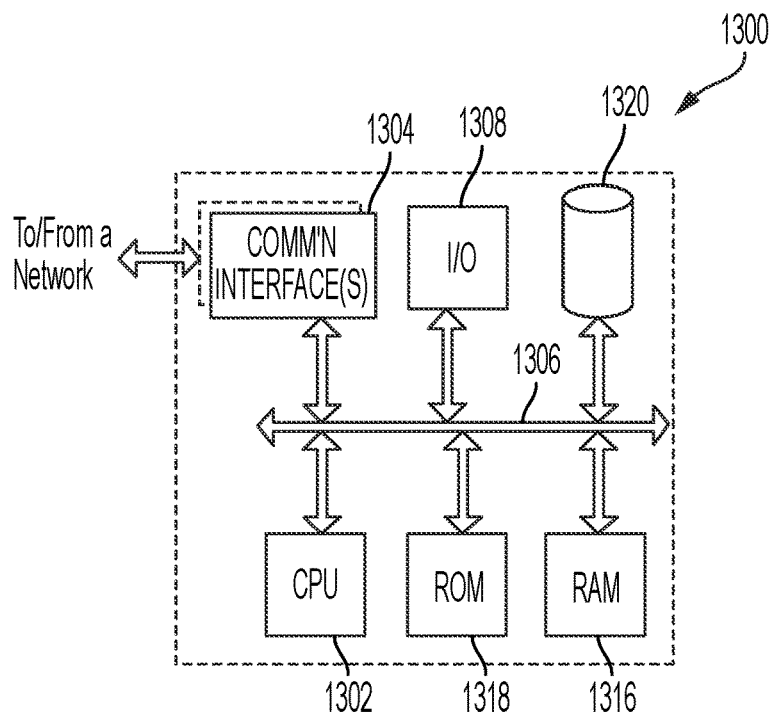
FIG. 13 is another functional block diagram illustrating a general purpose computer hardware platforms configured to implement the functional examples described with respect to FIGS. 1-11.

FIGS. 12 and 13 are functional block diagrams illustrating general-purpose computer hardware platforms configured to implement the functional examples described with respect to FIGS. 1-11 as discussed above.

Specifically, FIG. 12 illustrates an example network or host computer platform 1200, as may be used to implement for implementing a server. Specifically, FIG. 13 depicts an example computer 1300 with user interface elements, as may be used to implement a personal computer or other type of work station or terminal device, although the computer 1300 of FIG. 13 may also act as a server if appropriately programmed. It is believed that those skilled in the art are familiar with the structure, programming and general operation of such computer equipment and as a result the drawings should be self-explanatory.

Hardware of an example server computer (FIG. 12) includes a data communication interface for packet data communication. The server computer also includes a central processing unit (CPU) 1202, in the form of circuitry forming one or more processors, for executing program instructions. The server platform hardware typically includes an internal communication bus 1206, program and/or data storage 1216, 1218, and 1220 for various programs and data files to be processed and/or communicated by the server computer, although the server computer often receives programming and data via network communications. In one example, as shown in FIG. 12, the computer system includes a video display unit 1210, (e.g., a liquid crystal display (LCD) or a cathode ray tube (CRT)), an alphanumeric input device 1212 (e.g., a keyboard), a cursor control device 1214 (e.g., a mouse), each of which communicate via an input/output device (I/O) 1208. The hardware elements, operating systems and programming languages of such server computers are conventional in nature, and it is presumed that those skilled in the art are adequately familiar therewith. Of course, the server functions may be implemented in a distributed fashion on a number of similar hardware platforms, to distribute the processing load.

Hardware of a computer type user terminal device, such as a PC or tablet computer, similarly includes a data communication interface 1304, CPU 1302, main memory 1316 and 1318, one or more mass storage devices 1320 for storing user data and the various executable programs, an internal communication bus 1306, and an input/output device (I/O) 1308 (see FIG. 13).

Aspects of the methods for image projection mapping, as outlined above, may be embodied in programming in general purpose computer hardware platforms (such as described above with respect to FIGS. 12 and 13), e.g., in the form of software, firmware, or microcode executable by a networked computer system such as a server or gateway, and/or a programmable nodal device. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software, from one computer or processor into another, for example, from a processor 108 of the system 100 and/or from a processor 508 of the system 500 to a computer or software of another system (not shown). Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-transitory storage media include, for example, optical or magnetic disks, such as any of the storage devices in any computer(s) or the like. It may also include storage media such as dynamic memory, for example, the main memory of a machine or computer platform. Tangible transmission media include coaxial cables; copper wire and fiber optics, including the wires that include a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Program instructions may include a software or firmware implementation encoded in any desired language. Programming instructions, when embodied in machine readable medium accessible to a processor of a computer system or device, render computer system or device into a special-purpose machine that is customized to perform the operations specified in the program performed by processor 108 of the system 100 and/or processor 508 of the system 500.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is ordinary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 105 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that includes the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing describes what are considered to be the best mode and other examples, it is understood that various modifications may be made and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system comprising:
   a first drone and a second drone, each drone including a respective projector configured to project an image and a respective navigation unit configured to determine location information;
   a processing system coupled to the first drone and the second drone;
   a memory accessible to the processing system; and
   programming in the memory, wherein execution of the programming by the processing system configures the processing system to perform functions, including functions to:
   receive a change in location information for a moving object having a first portion and a second portion;
   receive a change in first location information for the first drone and a change in second location information for the second drone from the respective navigation units;
   adapt first relationship data responsive to changes in the location information for the moving object and the change in the first location information and second relationship data responsive to changes in the location information for the moving object and the change in the second location information;
   adjust the first image for projection on the first portion using the first location information and the first relationship data and the second image for projection on the second portion using the second location information and the second relationship data; and
   project the adjusted first image onto the first portion and the adjusted second image onto the second portion using the respective projector.

2. The system of claim 1, wherein each projector has a respective projection origin from which the images are projected and wherein the location information is associated with the respective projection origin.

3. The system of claim 2, wherein the moving object has a projection surface architecture including reference points that correspond to physical locations on the moving object, each reference point association with relationship data with respect to an architecture origin, and wherein each of the first and the second relationship data is one of a distance between the respective projection origin and the architecture origin of one or more of the reference points, an orientation of the drone with respect to the architecture origin of one or more of the reference points, or combinations thereof.

4. The system of claim 3, wherein the first drone comprises a camera and wherein the execution of the programming by the processing system further configures the processing system to perform additional functions, including functions to:
   capture one or more image of the moving object; and
   develop the projection surface architecture for the moving object from the one or more images.

5. The system of claim 4, wherein the execution of the programming by the processing system further configures the processing system to perform additional functions, including functions to:
   position the first drone relative to the projection surface such that the projection origin of the first drone is within a field of view of the imager; and
   identify distinct areas on the projection surface as the reference points for the projection surface from the one or more images.

6. The system of claim 3, wherein the execution of the programming by the processing system further configures the processing system to perform additional functions, including functions to:
capture one or more images of the moving object;
identify the moving object in the one or more images; and
retrieve the projection surface architecture for the identified moving object from the memory.

7. The system of claim 1, wherein the execution of the programming by the processing system further configures the processing system to perform additional functions, including functions to:
send speed and direction of the moving object to the first and second drones.

8. The system of claim 7, wherein the execution of the programming by the processing system further configures the processing system to perform additional functions, including functions to:
receive the speed and direction of the moving object from the moving object.

9. The system of claim 1, wherein the first and second drones each include an iterative predictor configured to predict speed and direction of the moving object.

10. A method for projecting a first image and a second image onto a moving object, the method comprising:
receiving a change in location information for a moving object having a first portion and a second portion;
receiving a change in first location information for a first drone and a change in second location information for a second drone from respective navigation units of the first and second drones;
adapting first relationship data responsive to changes in the location information for the moving object and the change in the first location information and second relationship data responsive to changes in the location information for the moving object and the change in the second location information;
adjusting the first image for projection on the first portion using the first location information and the first relationship data and the second image for projection on the second portion using the second location information and the second relationship data; and
projecting the adjusted first image onto the first portion and the adjusted second image onto the second portion using respective projectors of the first and second drones.

11. The method of claim 10, wherein each projector has a respective projection origin from which the images are projected, the location information is associated with the respective projection origin, the moving object has a projection surface architecture including reference points that correspond to physical locations on the moving object, each reference point association with relationship data with respect to an architecture origin, each of the first and the second relationship data is one of a distance between the respective projection origin and the architecture origin of one or more of the reference points, an orientation of the drone with respect to the architecture origin of one or more of the reference points, or combinations thereof, the method further comprises:
capturing one or more image of the moving object; and
developing the projection surface architecture for the moving object from the one or more images.

12. The method of claim 11, further comprising:
positioning the first drone relative to the projection surface such that the projection origin of the first drone is within a field of view of the imager; and
identifying distinct areas on the projection surface as the reference points for the projection surface from the one or more images.

13. The method of claim 11, further comprising:
capturing one or more images of the moving object;
identifying the moving object in the one or more images; and
retrieving the projection surface architecture for the identified moving object from a memory.

14. The method of claim 10, further comprising:
sending speed and direction of the moving object to the first and second drones.

15. The method of claim 14, further comprising:
receiving the speed and direction of the moving object from the moving object.

16. A non-transitory computer-readable medium including instructions for execution by a processor of a system to projecting a first image and a second image onto a moving object, the instructions, when executed by the processor, configuring the system to:
receive a change in location information for a moving object having a first portion and a second portion;
receive a change in first location information for a first drone and a change in second location information for a second drone from respective navigation units of the first and second drones;
adapt first relationship data responsive to changes in the location information for the moving object and the change in the first location information and second relationship data responsive to changes in the location information for the moving object and the change in the second location information;
adjust the first image for projection on the first portion using the first location information and the first relationship data and the second image for projection on the second portion using the second location information and the second relationship data; and
project the adjusted first image onto the first portion and the adjusted second image onto the second portion using respective projectors of the first and second drones.

17. The non-transitory computer-readable medium of claim 16, wherein each projector has a respective projection origin from which the images are projected, the location information is associated with the respective projection origin, the moving object has a projection surface architecture including reference points that correspond to physical locations on the moving object, each reference point association with relationship data with respect to an architecture origin, each of the first and the second relationship data is one of a distance between the respective projection origin and the architecture origin of one or more of the reference points, an orientation of the drone with respect to the architecture origin of one or more of the reference points, or combinations thereof, the instructions, when executed by the processor, further configuring the system to:
capture one or more image of the moving object; and
develop the projection surface architecture for the moving object from the one or more images.

18. The non-transitory computer-readable medium of claim 17, the instructions, when executed by the processor, further configuring the system to:
position the first drone relative to the projection surface such that the projection origin of the first drone is within a field of view of the imager; and identify distinct areas on the projection surface as the reference points for the projection surface from the one or more images.

19. The non-transitory computer-readable medium of claim 17, the instructions, when executed by the processor, further configuring the system to:
capture one or more images of the moving object;
identify the moving object in the one or more images; and
retrieve the projection surface architecture for the identified moving object from a memory.

20. The non-transitory computer-readable medium of claim 16, the instructions, when executed by the processor, further configuring the system to:
send speed and direction of the moving object to the first and second drones.

* * * * *